United States Patent
Kim et al.

(10) Patent No.: US 11,668,558 B2
(45) Date of Patent: Jun. 6, 2023

(54) THICKNESS ESTIMATION METHOD AND PROCESSING CONTROL METHOD

(71) Applicant: Samsung Electronics Co., Ltd., Suwon-si (KR)

(72) Inventors: Jongsu Kim, Seongnam-si (KR); Wansung Park, Seoul (KR); Doohyun Cho, Hwaseong-si (KR); Sungha Kim, Suwon-si (KR); Jaeyoun Wi, Suwon-si (KR); Kijoo Hong, Seoul (KR); Taejoong Kim, Hwaseong-si (KR); Youngsu Ryu, Suwon-si (KR); Kwangsung Lee, Yongin-si (KR); Min Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 17/214,830

(22) Filed: Mar. 27, 2021

(65) Prior Publication Data

US 2022/0065618 A1 Mar. 3, 2022

(30) Foreign Application Priority Data

Aug. 28, 2020 (KR) ........................ 10-2020-0109589

(51) Int. Cl.
*G01B 11/06* (2006.01)
*G01N 21/95* (2006.01)
(Continued)

(52) U.S. Cl.
CPC ..... *G01B 11/0633* (2013.01); *G01N 21/8422* (2013.01); *G01N 21/9501* (2013.01);
(Continued)

(58) Field of Classification Search
CPC .......... G01B 11/0633; G01N 21/8422; G01N 21/9501; G01N 2021/8427; G06T 7/0004; G06T 2207/30148
See application file for complete search history.

(56) References Cited

U.S. PATENT DOCUMENTS

| 7,049,156 B2 | 5/2006 | Kueny |
| 7,952,708 B2 | 5/2011 | Ravid et al. |

(Continued)

FOREIGN PATENT DOCUMENTS

JP 6465015 B2 2/2019

*Primary Examiner* — Jamil Ahmed
(74) *Attorney, Agent, or Firm* — Muir Patent Law, PLLC

(57) ABSTRACT

A thickness estimation method may include: obtaining a test spectrum image; obtaining test spectrum data; measuring a thickness of a test layer formed on the test substrate at the plurality of positions; generating a regression analysis model using a correlation between the thickness of the test layer and the test spectrum data; obtaining a spectrum image; and estimating a thickness of a target layer over the entire area of the semiconductor substrate by applying the spectrum image to the regression analysis model. The thickness corresponding to the entire area of the semiconductor substrate that is being transferred is estimated using the thickness estimation method according to an exemplary embodiment in the present disclosure, such that whether or not processing is normally performed may be examined without requiring a separate time. In addition, an examination result may be feedbacked to processing equipment to improve production yield.

20 Claims, 18 Drawing Sheets

(51) Int. Cl.
*G01N 21/84* (2006.01)
*G06T 7/00* (2017.01)

(52) U.S. Cl.
CPC .... *G06T 7/0004* (2013.01); *G01N 2021/8427* (2013.01); *G06T 2207/30148* (2013.01)

(56) References Cited

U.S. PATENT DOCUMENTS

| | | |
|---|---|---|
| 9,056,383 B2 | 6/2015 | David et al. |
| 9,355,442 B2 | 5/2016 | Iwanaga et al. |
| 10,192,794 B2 | 1/2019 | Kim |
| 10,565,701 B2 | 2/2020 | Benvegnu et al. |
| 2004/0070773 A1* | 4/2004 | Hirose ............... G01B 11/0625 356/630 |
| 2011/0199476 A1 | 8/2011 | Ravid et al. |
| 2018/0061032 A1 | 3/2018 | Benvegnu |
| 2019/0095797 A1 | 3/2019 | Dhandapani et al. |
| 2020/0091013 A1 | 3/2020 | Liu et al. |

\* cited by examiner

THICKNESS ESTIMATION METHOD AND PROCESSING CONTROL METHOD

CROSS-REFERENCE TO RELATED APPLICATION(S)

This application claims benefit of priority under 35 U.S.C. § 119 to Korean Patent Application No. 10-2020-0109589, filed on Aug. 28, 2020, in the Korean Intellectual Property Office, the disclosure of which is incorporated herein by reference in its entirety.

BACKGROUND

1. Field

The present disclosure relates to a thickness estimation method and a processing control method.

2. Description of Related Art

A semiconductor production line includes processing chambers for performing semiconductor processing, and chemical-mechanical polishing processing, deposition processing, etching processing, and the like may be performed in the processing chambers. Once the semiconductor processing is completed in each processing chamber, examination processing for determining whether or not the semiconductor processing is accurately performed can be performed. In general, the examination processing may be performed by transferring a semiconductor substrate subjected to the semiconductor processing to optical critical dimension (OCD) measurement equipment for measuring the thickness of a layer such as a thin film formed on the semiconductor substrate. However, in this case, a separate time and space for performing the examination processing are required, which may cause deterioration in productivity and an increase in cost.

SUMMARY

An aspect of the present disclosure may provide a thickness estimation method and a processing control method, in which an image obtained by capturing a spectrum reflected from a wafer is used to estimate a thickness corresponding to an entire area of a layer formed on a semiconductor substrate that is being transferred, such that whether or not processing is normally performed may be rapidly determined without requiring a separate time, an examination result may be feedbacked to processing equipment to improve production yield.

According to an aspect of the present disclosure, a thickness estimation method may include: obtaining a test spectrum image from reflected light obtained by irradiating a test substrate with light; obtaining test spectrum data included in a predetermined wavelength band at a plurality of positions on the test substrate, from the test spectrum image; measuring a thickness of a test layer formed on the test substrate at the plurality of positions; generating a regression analysis model using a correlation between the thickness of the test layer and the test spectrum data at the plurality of positions, and storing the regression analysis model in a memory; irradiating a semiconductor substrate that is being transferred with light; obtaining a spectrum image corresponding to an entire area of the semiconductor substrate; and estimating a thickness of a target layer corresponding to the test layer over the entire area of the semiconductor substrate by applying the spectrum image to the regression analysis model.

According to another aspect of the present disclosure, a processing control method may include: obtaining a test spectrum image from reflected light obtained by irradiating a test substrate with light; generating a regression analysis model using a correlation between test spectrum data included in the test spectrum image and thickness data of a test layer formed on the test substrate, and storing the regression analysis model in a memory; performing a semiconductor processing on a first semiconductor substrate to which a first processing control parameter is applied; obtaining a spectrum image of the first semiconductor substrate on a transfer path of the first semiconductor substrate subjected to the semiconductor processing; obtaining spectrum data included in a predetermined wavelength band from the spectrum image; updating the regression analysis model using a correlation between the spectrum data and the first processing control parameter; determining a second processing control parameter using the regression analysis model; and performing the semiconductor processing on a second semiconductor substrate, which is the same as the first semiconductor substrate, and to which the second processing control parameter is applied.

According to another aspect of the present disclosure, a thickness estimation method may include: obtaining a test spectrum image corresponding to a plurality of positions on a test substrate; generating a regression analysis model using a correlation between test spectrum data included in the test spectrum image and thickness data of a test layer formed on the test substrate, and storing the regression analysis model in a memory; irradiating a semiconductor substrate that is being transferred with light and obtaining a spectrum image corresponding to an entire area of the semiconductor substrate; and estimating a thickness of a target layer over the entire area of the semiconductor substrate by applying spectrum data based on the spectrum image of the semiconductor substrate to the regression analysis model.

BRIEF DESCRIPTION OF DRAWINGS

The above and other aspects, features, and advantages of the present disclosure will be more clearly understood from the following detailed description taken in conjunction with the accompanying drawings, in which like numerals refer to like elements throughout. In the drawings.

DETAILED DESCRIPTION

Hereinafter, exemplary embodiments of the present disclosure will now be described in detail with reference to the accompanying drawings.

Figure 1:
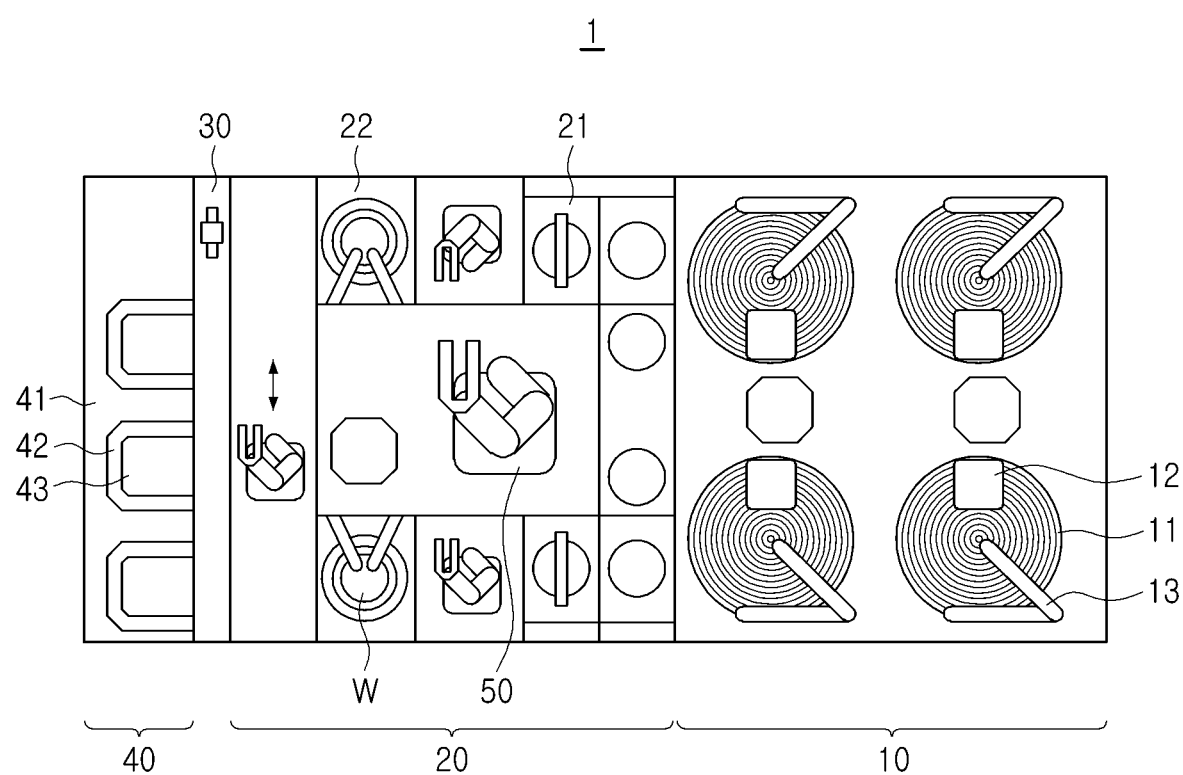
FIG. 1 is a schematic configuration diagram of semiconductor processing equipment including an examination device for performing a thickness estimation process, according to an exemplary embodiment in the present disclosure.

FIG. 1 is a schematic configuration diagram of semiconductor processing equipment including an examination device for performing a thickness estimation process according to an exemplary embodiment in the present disclosure.

Referring to FIG. 1, the thickness estimation method according to the exemplary embodiment in the present disclosure may be performed by an examination device 30 included in semiconductor processing equipment 1 illustrated in FIG. 1. Examples of the semiconductor processing equipment 1 may include polishing processing equipment that performs chemical-mechanical polishing (CMP) processing, deposition processing equipment that performs deposition processing, etching processing equipment that removes at least a partial region of a semiconductor substrate W and/or element layers formed on the semiconductor substrate W using plasma containing radicals and ions of source gas and/or an etching solution, and spinner equipment that performs spin-coating processing. As an example, the semiconductor processing equipment 1 illustrated in FIG. 1 may be the polishing processing equipment that performs the CMP processing. However, the semiconductor processing equipment 1 is not limited to the example illustrated in FIG. 1, and arrangement of the semiconductor processing equipment 1 and component devices thereof may vary depending on processing.

Various structures may be formed on the semiconductor substrate W through a plurality of semiconductor processing equipment including the semiconductor processing equipment 1, thereby implementing a desired semiconductor device. Element layers including at least one of semiconductor elements, wiring patterns connected to the semiconductor elements, or insulating layers covering the semiconductor elements and the wiring pattern may be formed on the semiconductor substrate W. As an example, the semiconductor substrate W may be a wafer, and the elements layer formed on the semiconductor substrate W may be a layer, for example, a thin film. However, the semiconductor substrate W is not limited thereto, and may be various substrates other than the wafer, for example, a mother substrate for display.

Referring to FIG. 1, the semiconductor processing equipment 1 may include a polishing device 10, a washing device 20, the examination device 30, and an index device 40.

The polishing device 10 may perform the CMP processing on the semiconductor substrate W. As an example, the polishing device 10 may include a plurality of polishing tables 11 and carrier heads 12 for pressing the semiconductor substrate W with respect to polishing pads on the plurality of polishing tables 11 that rotate. Further, the polishing device 10 may further include slurry supplying devices 13 for supplying a slurry solution required for the CMP processing to the polishing pads.

For example, the semiconductor substrate W may be moved by the carrier heads 12, polished on the polishing tables 11, and then transferred to the washing device 20. For example, a transfer path of the semiconductor substrate W may be a rectangular circulation path. However, this is only an example, and the transfer path is not limited thereto. The semiconductor substrate W may be transferred along various paths according to examples.

The washing device 20 may be disposed on one side of the polishing device 10 and wash out a foreign material remaining on the surface of the semiconductor substrate W. The washing device 20 may include a contact-type washing unit 21 and a non-contact-type washing unit 22. The contact-type washing unit 21 may include a washing brush that comes into contact with the surface of the semiconductor substrate W and rotates. The non-contact-type washing unit 22 may perform washing by spraying a washing fluid such as deionized water, steam, or a heterogeneous fluid, or isopropyl alcohol to the surface of the semiconductor substrate W, or by supplying vibration energy to the surface of the semiconductor substrate W.

The index device 40 may be disposed adjacent to a side of the washing device 20 and may load and/or unload the semiconductor substrate W. As an example, the index device 40 may include a cassette stage 41 extending in one direction. The cassette stage 41 may include a plurality of support plates 42. The support plates 42 may each include a wafer carrier 43 in which a plurality of semiconductor substrates W are accommodated.

The examination device 30 for performing the thickness estimation method according to the exemplary embodiment in the present disclosure may be disposed between the washing device 20 and the index device 40 and examine the washed semiconductor substrate W. As an example, the examination device 30 may be a device that estimates the thickness of a target layer formed on the semiconductor substrate W using the thickness estimation method according to the exemplary embodiment in the present disclosure. Alternatively and/or additionally, the examination device 30 may be a device that determines a processing control parameter based on a target thickness of a target layer to be formed on the semiconductor substrate W according to a processing control method according to an exemplary embodiment in the present disclosure to perform processing.

In the semiconductor processing equipment 1, the semiconductor substrate W may be transferred by a transfer robot 50. As an example, the transfer robot 50 may transfer the semiconductor substrate W from the wafer carrier 43 to the polishing device 10 along a predetermined transfer path. Further, the transfer robot 50 may transfer the semiconductor substrate W from the polishing device 10 to the washing device 20, and/or from the washing device 20 to the index device 40. However, the shape and disposition of the transfer robot 50 illustrated in FIG. 1 are only examples, and embodiments are not limited thereto. As an example, the semiconductor substrate W may be transferred by a component other than the transfer robot 50, and the transfer robot 50 may be separately disposed for each device.

As an example, the transfer robot 50 may be a handler. Further, the transfer robot 50 may include a chuck for fixing the semiconductor substrate W and a plurality of protrusion that come into contact with the semiconductor substrate W may be formed on the chuck. The transfer robot 50 may further include a linear stage for transferring the semiconductor substrate W.

Meanwhile, the semiconductor substrate may be examined by the examination device 30 during transfer from the washing device 20 to the index device 40. As an example, the examination device 30 may capture a spectrum image of light reflected from an upper surface of the semiconductor substrate W as the semiconductor substrate W passes through the examination device 30, and may estimate the thickness of an entire region of the target layer formed on the semiconductor substrate W using the captured spectrum image and a regression analysis model that is generated in advance. As an example, the regression analysis model may include thickness data and spectrum data based on coordinates of the semiconductor substrate W.

For example, in the thickness estimation method according to the exemplary embodiment in the present disclosure, the thickness of the target layer may be estimated without requiring a separate stage or time for measuring the thickness of the target layer formed on the semiconductor substrate W. Therefore, a procedure of transferring the semiconductor substrate W to a separate stage may be omitted, and thickness estimation may be performed in a state where transfer of the semiconductor substrate W is not stopped. As a result, processing efficiency may be improved and production costs may be reduced. For example, as compared with an existing method in which the thickness of the target layer is measured in a point unit, the unit per equipment hour (UPEH) may be increased within a range of approximately 5% to 25%. As an example, in a case in which it is assumed that the thickness of the target layer is measured at 13 points, a time taken for the polishing processing of the semiconductor substrate may be decreased from approximately 400 seconds to approximately 340 seconds.

Figure 2:
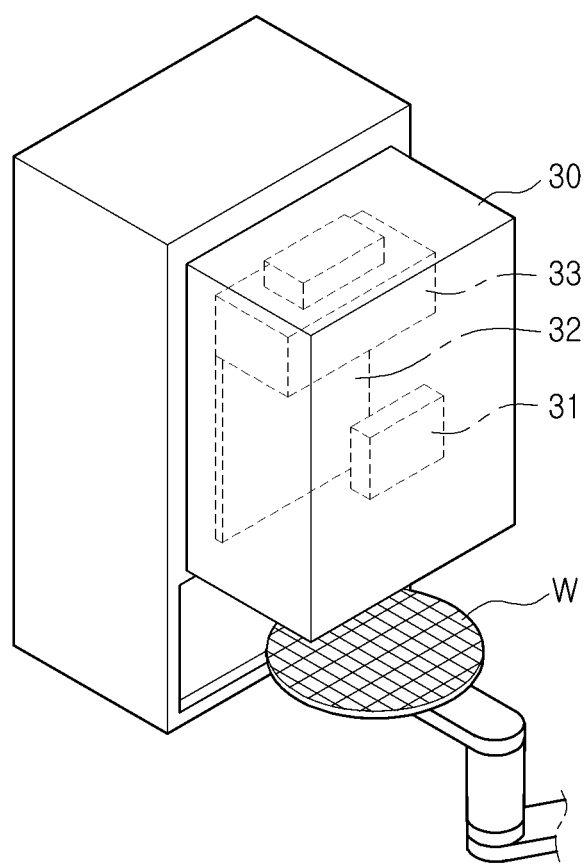
FIG. 2 is a schematic perspective view of the examination device for performing the thickness estimation method, according to the exemplary embodiment in the present disclosure.

FIG. 2 is a schematic perspective view of the examination device for performing the thickness estimation method according to the exemplary embodiment in the present disclosure.

Referring to FIG. 2, the examination device 30 for performing the thickness estimation method according to the exemplary embodiment in the present disclosure may include an illumination unit 31, a reflection unit 32, and an optical system 33. Meanwhile, although the examination device 30 according to the example illustrated in FIG. 2 includes the illumination unit 31, the reflection unit 32, and the optical system 33, components of the examination device 30 do not have to be limited to those illustrated in FIG. 2. As an example, light emitted from the illumination unit 31 may be reflected from the upper surface of the semiconductor substrate W and directly incident on the optical system 33 without being reflected from the reflection unit 32 again.

Further, in a case in which the illumination unit 31 and the reflection unit 32 are not integrally coupled to the optical system 33, the examination device 30 may perform the thickness estimation method according to the exemplary embodiment in the present disclosure using an illumination device and a reflection device that are separately provided. On the other hand, in a case in which the illumination unit 31 and the reflection unit 32 are integrally coupled to the optical system 33, a module for performing the thickness estimation method according to the exemplary embodiment in the present disclosure may be minimized and thus may be extensively applied to various processes such as scratch analysis and monitoring.

Meanwhile, the examination device 30 that performs the thickness estimation method according to the exemplary embodiment in the present disclosure may be coupled to the semiconductor processing equipment and independently operated, and may be coupled to the semiconductor processing equipment and operated without a separate complicated installation procedure and/or a semiconductor processing equipment modification procedure. As the examination device 30 is disposed on the transfer path as described above, processing efficiency may be improved as compared with a method in which a thickness measurement system is installed in a separate space.

Meanwhile, according to an exemplary embodiment, the examination device 30 may further include a controller and a memory. For example, the controller may correct the spectrum image obtained using the optical system 33, and obtain spectrum data from the spectrum image. In addition, the controller may generate and/or update the regression analysis model using the obtained spectrum data and thickness data, or may estimate the thickness of the target layer formed on the semiconductor substrate W by applying the regression analysis model. As an example, the memory may store the regression analysis model generated by the controller.

As an example, the illumination unit 31 may include a white light emitting diode (LED) light as a light source, and may irradiate the semiconductor substrate W with light in a process in which the semiconductor substrate W is transferred. The light reflected from the surface of the semiconductor substrate W may be reflected from the reflection unit 32 again and be incident on the optical system 33. As an example, the reflection unit 32 may be a mirror.

The optical system 33 may include a lens 34 on which the light reflected from the semiconductor substrate W is incident, a spectrometer module 35 splitting the incident light through the lens 34, and a scan camera 36 capturing an image of the light split by the spectrometer module 35 in a form of a spectrum. Meanwhile, the scan camera may include a plurality of cameras coupled to improve resolution, and each camera may include an image sensor converting the light reflected from the semiconductor substrate W into an electrical signal. As an example, the scan camera 36 may include a first camera capturing an image of a first region of the semiconductor substrate W and a second camera capturing an image of a second region of the semiconductor substrate W. The images of the first and second regions may be combined to form one spectrum image. However, this is only an example, and the scan camera is not limited thereto. The number of cameras that capture an image of a partial region for one spectrum image may be two or more.

Figure 3A:
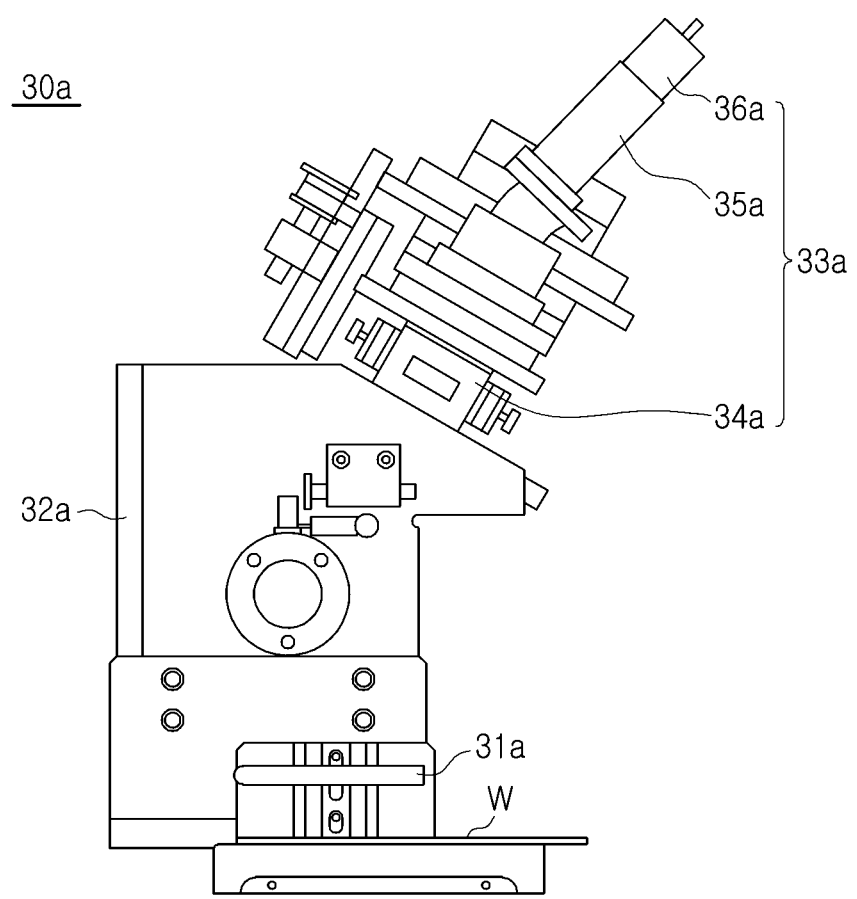
FIGS. 3A and 3B are schematic plan views of examination devices for performing the thickness estimation method, according to exemplary embodiments in the present disclosure.
Figure 3B:
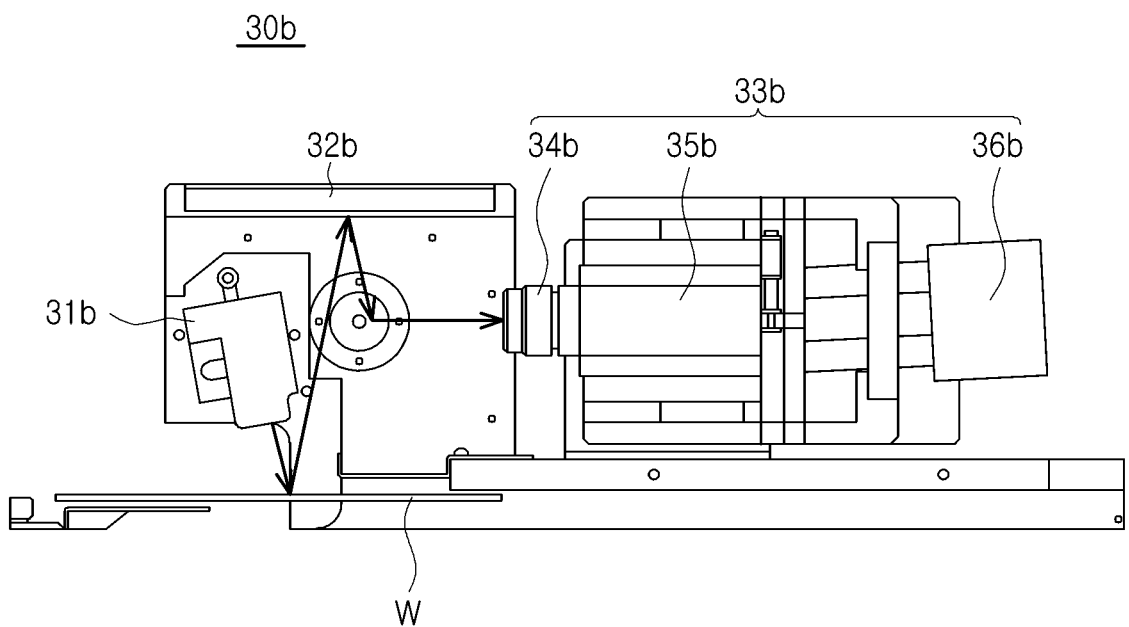

FIGS. 3A and 3B are schematic plan views of examination devices for performing the thickness estimation method according to exemplary embodiments in the present disclosure.

The shape and disposition of the examination device 30 does not have to be limited to those in the example illustrated in FIG. 2. As an example, referring to FIGS. 3A and 3B, the shape of an examination device 30a or 30b may vary depending on processing to which the examination device 30a or 30b is to be applied.

Referring to FIG. 3A, the examination device 30a that performs the thickness estimation method according to the exemplary embodiment in the present disclosure may be an examination device 30a included in polishing processing equipment. After polishing processing is completed, an illumination unit 31a may irradiate the upper surface of the semiconductor substrate W with light. The irradiated light may be sequentially reflected from the upper surface of the semiconductor substrate W and a reflection unit 32a, and may be incident on an optical system 33a. The light incident on the optical system 33a through the lens 34a may be slit in a form of a spectrum by a spectrometer module 35a, and a scan camera 36a may capture a spectrum image.

Referring to FIG. 3B, the examination device 30b that performs the thickness estimation method according to the exemplary embodiment in the present disclosure may be an examination device 30b included in spinner equipment. The examination device 30b may include an illumination unit 31b, a reflection unit 32b, and an optical system 33b, and the optical system 33b may include a lens 34b, a spectrometer module 35b, and a scan camera 36b. Arrangement of the components included in the examination device 30b is different from that of the examination device 30a illustrated in FIG. 3A, but an operation for performing the thickness estimation method according to the exemplary embodiment may be similar to that of the examination device 30a.

Meanwhile, the thickness estimation method and the processing control method according to the exemplary embodiment in the present disclosure may largely include three steps. As an example, the thickness estimation method according to the exemplary embodiment in the present disclosure may include measuring the thickness of a test layer formed on a test substrate, and capturing a spectrum image to generate a regression analysis model. Further, the thickness estimation method may include estimating the thickness of a target layer formed on a semiconductor substrate by capturing a spectrum image of the semiconductor substrate and applying the spectrum image to the generated regression analysis model.

The processing control method according to the exemplary embodiment in the present disclosure may include updating the regression analysis model using a first processing control parameter when performing processing on a first semiconductor substrate and determining a second processing control parameter using the regression analysis model when performing processing on a second semiconductor substrate. The thickness estimation method and the processing control method according to the exemplary embodiment in the present disclosure may be performed in combination to improve processing efficiency.

Figure 4:
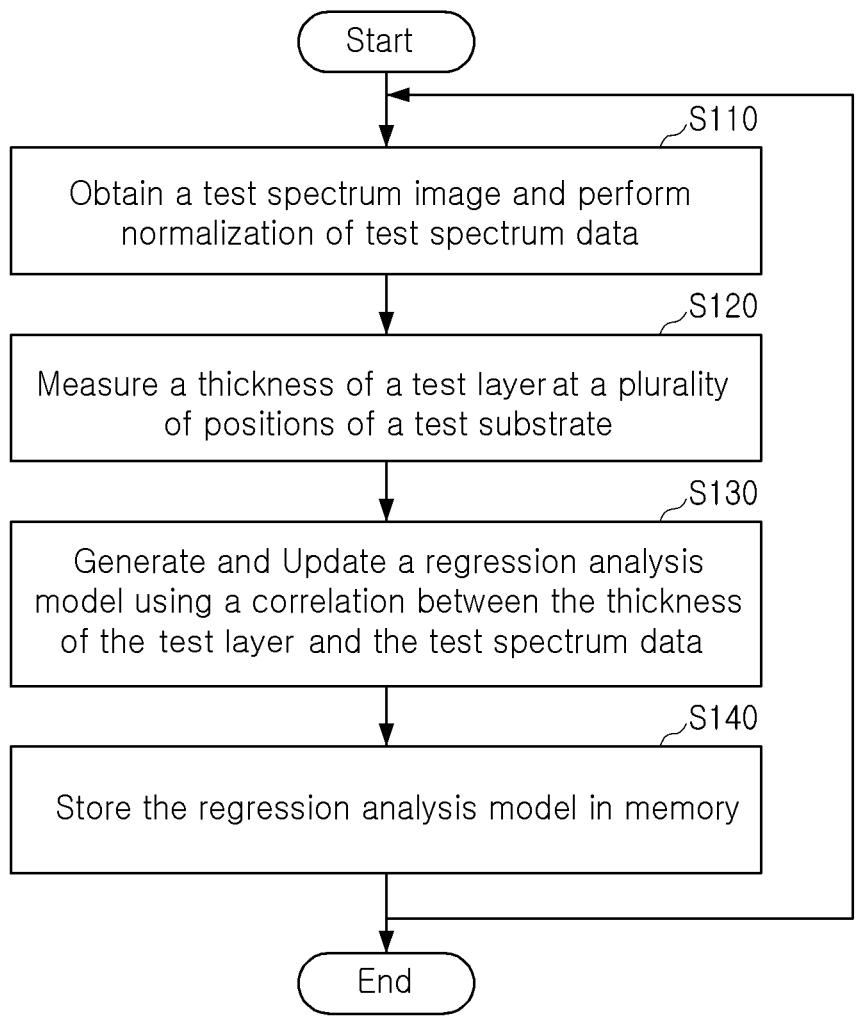
FIG. 4 is a flowchart illustrating a process of generating a regression analysis model in the thickness estimation method, according to the exemplary embodiment in the present disclosure.

FIG. 4 is a flowchart illustrating a process of generating the regression analysis model in the thickness estimation method according to the exemplary embodiment in the present disclosure.

Referring to FIG. 4, the thickness estimation method according to the exemplary embodiment in the present disclosure may include generating the regression analysis model using a machine learning technique before performing actual processing, in order to determine whether or not processing for the semiconductor substrate W is appropriately performed.

The thickness estimation method according to the exemplary embodiment in the present disclosure may include obtaining a test spectrum image and performing normalization of the test spectrum data to generate the regression analysis model (S110). As an example, the examination device 30 illustrated in FIG. 2 may capture a spectrum image of light reflected from an upper surface of the test substrate. The captured spectrum image may be defined as a test spectrum image. The test spectrum image may be an image corresponding to an entire area of the test substrate, and may include test spectrum data according to coordinates. As an example, the test spectrum data may include wavelength data for each coordinate. The test spectrum data may be normalized using test spectrum images obtained by performing capturing multiple times.

Meanwhile, the test spectrum data may be reduced by a principal component analysis (PCA) technique. As an example, only test spectrum data included in a predetermined wavelength band may be extracted at a plurality of positions by the PCA technique and used. As an example, the predetermined wavelength band may be determined based on the quality of the test layer formed on the upper surface of the test substrate.

The thickness estimation method according to the exemplary embodiment in the present disclosure may include measuring the thickness of the test layer (e.g., thin film) at a plurality of positions on the test substrate to generate the regression analysis model (S120). According to an exemplary embodiment, the thickness of the test layer formed on the upper surface of the test substrate may be measured using a spectrum-based non-destructive optical measurement method using a spectroscopic ellipsometer (SE). However, this is only an example, and a method for measuring the thickness of the test layer is not limited thereto. The thickness of the test layer formed on the upper surface of the test substrate may be measured by various methods.

Further, the thickness estimation method according to the exemplary embodiment in the present disclosure is not limited to including the step of measuring a thickness of a test layer, as in S120, and a test substrate with a test layer whose thickness is already known may be used. Therefore, the thickness estimation method according to the exemplary embodiment in the present disclosure does not have to include S120.

Further, S120 in which the thickness of the test layer formed on the test substrate is measured may be performed separately from S110 in which the normalized test spectrum data are obtained. As an example, the semiconductor processing equipment may separately include a thickness measurement device that obtains a data set for generating the regression analysis model, in addition to the examination device 30 illustrated in FIG. 1.

Meanwhile, the data set for generating the regression analysis model may be generated using the thickness of the test layer formed on the test substrate and the test spectrum data for each coordinate obtained from the test spectrum image. The regression analysis model may be generated using at least one of machine learning techniques based on the generated data set (S130). The machine learning technique may be a technique using at least one of algorithms such as random forest, AdaBoost, gradient boosting, polynomial regression, and Gaussian process regression. A process of generating the regression analysis model according to each algorithm will be described later.

The generated regression analysis model may be stored in the memory (S140). Meanwhile, S110 and S120 may be repeated multiple times. The generated data set may be used to train and verify a thickness estimation model, and therefore, the regression analysis model may be continuously updated.

Figure 5:
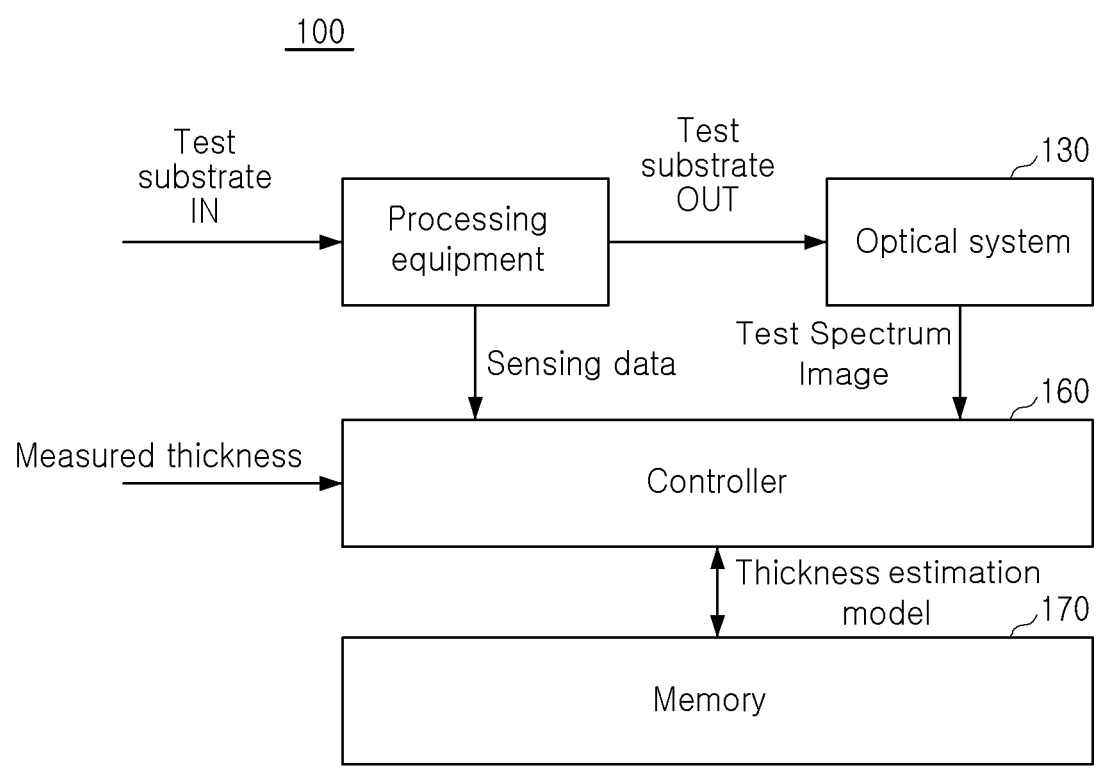
FIG. 5 is a block diagram illustrating components for generating the regression analysis model in the thickness estimation method, according to the exemplary embodiment in the present disclosure.

FIG. 5 is a block diagram illustrating components for generating the regression analysis model in the thickness estimation method according to the exemplary embodiment in the present disclosure.

Referring to FIG. 5, an examination device 100 for performing the thickness estimation method according to the exemplary embodiment in the present disclosure may include an optical system 130, a controller 160, and a memory 170. However, this is only an example, and the components of the examination device 100 are not limited thereto. At least some of the components described above may be provided as separate devices as long as the thickness estimation method according to the exemplary embodiment in the present disclosure may be performed. As an example, the controller 160 and the memory 170 may be provided separately from the processing equipment and the examination device 100 for performing the thickness estimation method according to the exemplary embodiment in the present disclosure.

A test substrate may pass through the processing equipment to generate the regression analysis model. Sensing data for the test substrate that are obtained in the processing process may be transferred to the controller 160. The sensing data may be used for the generation of the regression analysis model. Meanwhile, the optical system 130 may obtain a test spectrum image of light reflected from the test substrate passing through the processing equipment and transfer the test spectrum image to the controller 160.

Meanwhile, the controller 160 may receive thickness data measured at a plurality of positions on the test substrate. The thickness data measured at the plurality of positions may be different from each other. As an example, the plurality of positions may be positions that are determined as being positions at which a result of the semiconductor processing may be examined, and may be arbitrarily selected by a user. However, this is only an example, and the plurality of positions are not limited thereto. The thickness of a test layer formed on the test substrate may be measured over an entire area of the test substrate.

The controller 160 may generate the thickness estimation model using the measured thickness of the test layer formed on the test substrate, the sensing data, and the test spectrum. The generated thickness estimation model may be stored in the memory 170. The controller 160 may apply the spectrum image captured by the optical system 130 to the regression analysis model stored in the memory 170 to estimate the thickness of the target layer formed on the semiconductor substrate during the semiconductor processing.

Meanwhile, the above-described process may be repeated multiple times, and the regression analysis model stored in the memory 170 may be continuously updated by the controller 160. As an example, in a case in which the examination device 100 includes a separate thickness measurement device for measuring the thickness of the test layer formed on the test substrate, the regression analysis model stored in the memory 170 may be automatically updated.

Although not illustrated, the controller 160 can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the controller 160 (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the controller 160 can include antennas, network interfaces that provide wireless and/or wire line digital and/or analog interface to one or more networks over one or more network connections (not shown), a power source that provides an appropriate alternating current (AC) or direct current (DC) to power one or more components of the controller 160, and a bus that allows communication among the various disclosed components of the controller 160.

The memory 170 may be any suitable type of memory, such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored.

Figure 6:
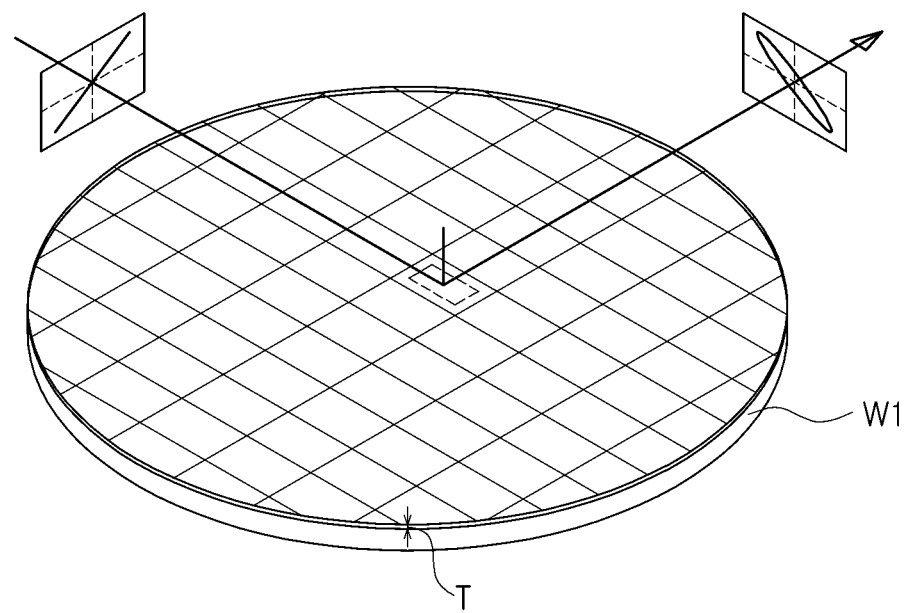
FIG. 6 is a diagram for describing a process of measuring the thickness of a test layer formed on a test substrate in the thickness estimation method, according to the exemplary embodiment in the present disclosure.

FIG. 6 is a diagram for describing a process of measuring the thickness of a test layer formed on a test substrate in the thickness estimation method according to the exemplary embodiment in the present disclosure.

Referring to FIG. 6, the thickness estimation method according to the exemplary embodiment in the present disclosure may include measuring the thickness T of a test layer formed on a test substrate W1 using a non-destructive optical measurement method that does not damage the test substrate W1. As an example, the non-destructive optical measurement method may be an optical critical dimension (OCD) measurement method. As an example, the test layer formed on the test substrate W1 may be one or more test element layers. The test element layers may include a semiconductor material, a conductive material, an insulating material, a photo resist, and the like.

According to an exemplary embodiment in the present disclosure, the test substrate W1 may be irradiated with light, and light reflected from the test substrate W1 may be received to measure the thickness T of the test layer formed on the test substrate W1. For example, the OCD measurement may be performed by a spectroscopic ellipsometer (SE). The spectroscopic ellipsometer may selectively extract, from the reflected light, light reflected from test positions at which the thickness T is to be measured, and may obtain and analyze a spectrum of the extracted light to measure the thickness T of the test layer at the test positions. As an example, the light with which the test substrate W1 is irradiated may pass through a linear polarizer before the irradiation of the test substrate W1, and the light reflected from the test substrate W1 may be extracted through an analyzer.

The thickness estimation method according to the exemplary embodiment in the present disclosure may include obtaining thickness (T) data of the test layer at the test positions of the test substrate W1. The thickness (T) data may be used as a data set for the generation of the regression analysis model. Meanwhile, although it is described in thickness estimation method according to the exemplary embodiment in the present disclosure that the thickness T of the test layer formed on the test substrate W1 is measured by the spectroscopic ellipsometer, this is only an example, and a device for measuring the thickness T of the test layer formed on the test substrate W1 is not limited thereto. According to exemplary embodiments, the spectroscopic ellipsometer may be replaced with various devices that may measure the thickness T of the test layer formed on the test substrate W1.

Figure 7:
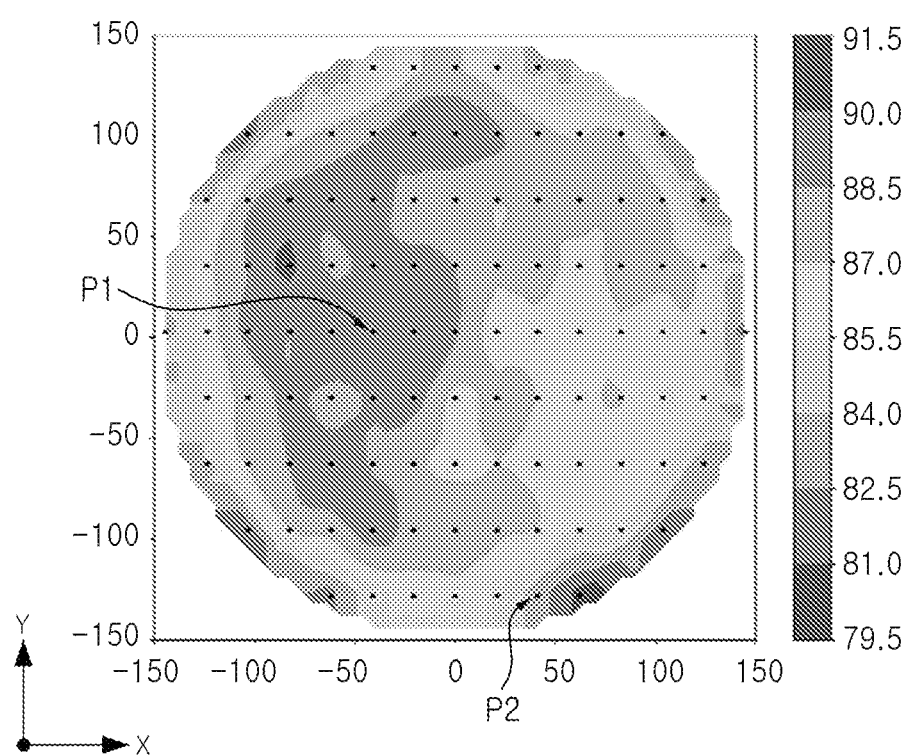
FIG. 7 is a diagram for describing a result of measuring the thickness of the test layer formed on the test substrate in the thickness estimation method, according to the exemplary embodiment in the present disclosure.

FIG. 7 is a diagram for describing a result of measuring the thickness of the test layer formed on the test substrate in the thickness estimation method according to the exemplary embodiment in the present disclosure.

Referring to FIG. 7, the separately provided spectroscopic ellipsometer may measure the thickness of the test layer in a unit of local area. As an example, the thickness of the test layer may be measured for each coordinate, and thickness distribution illustrated in FIG. 7 may be completed using the thickness of the test layer measured at each coordinate.

Meanwhile, the thickness of the test layer formed on the test substrate may be non-uniform over the entire area. As an example, the thickness of the formed test layer may tend to increase as distance from the center of the test substrate decreases. As an example, the thickness of the test layer at a first coordinate P1 which is a coordinate close to the center of the test substrate may be in a range of approximately 88.5 nm to 90 nm. On the other hand, the thickness of the test layer at a second coordinate P2 which is a coordinate distant from the center of the test substrate may be in a range of approximately 81 nm to 82.5 nm. However, the thickness distribution illustrated in FIG. 7 is only an example, and the thickness distribution is not limited thereto. The thickness distribution and the thickness of the test layer may vary depending on exemplary embodiments.

Figure 8:
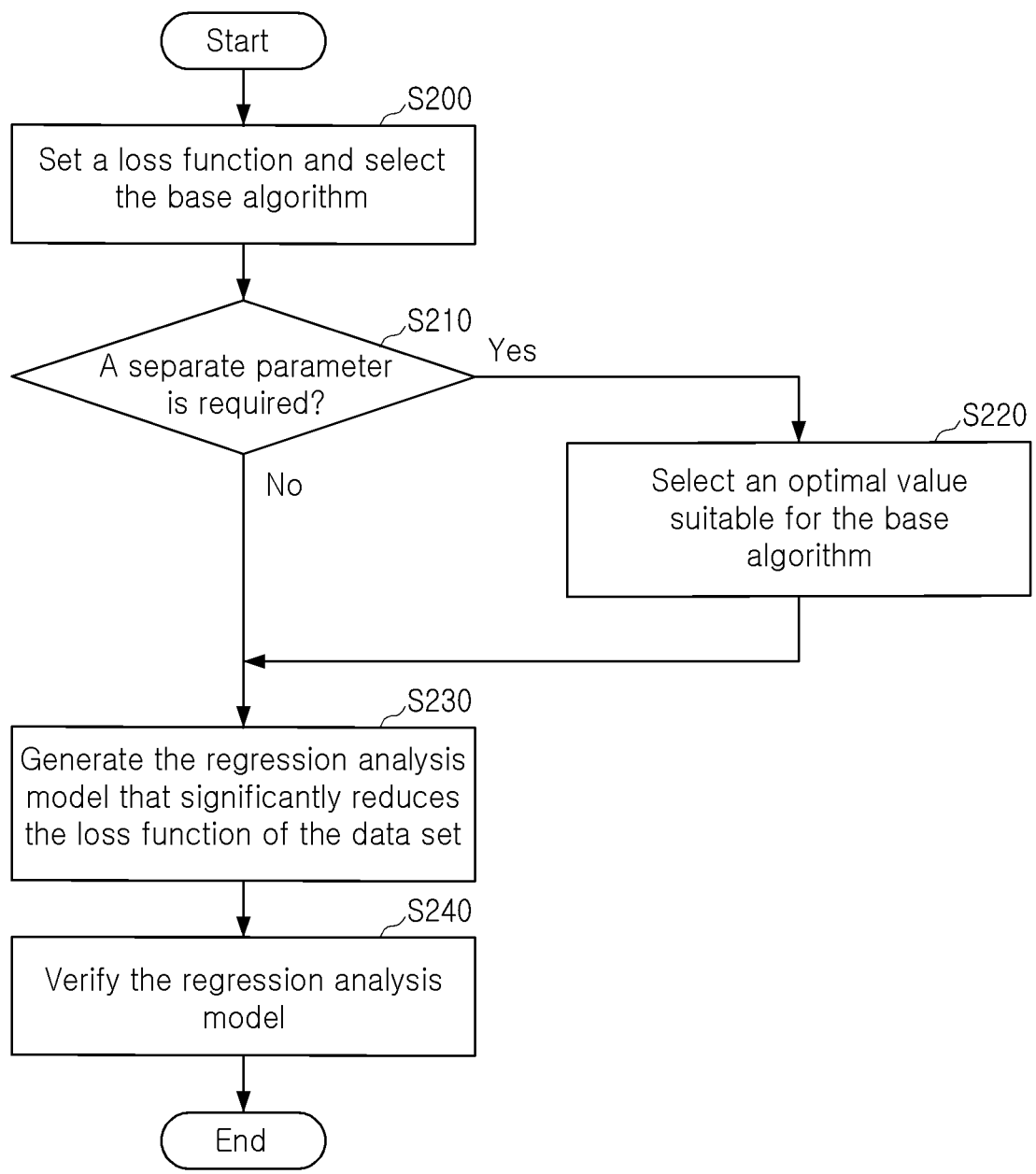
FIG. 8 is a flowchart for describing a process of generating the regression analysis model in the thickness estimation method, according to the exemplary embodiment in the present disclosure.

FIG. 8 is a flowchart for describing a process of generating the regression analysis model in the thickness estimation method according to the exemplary embodiment in the present disclosure.

Hereinafter, a method of generating the regression analysis model will be described with also reference to FIG. 5 for convenience of explanation. Referring to FIGS. 5 and 8, the controller 160 may generate the regression analysis model using the obtained data set, and store the regression analysis model in the memory 170. The data set may include test spectrum data obtained from the test spectrum image generated by capturing an image of the test substrate by the optical system 130, and thickness data of the test layer on the test substrate, the thickness data being measured using the spectroscopic ellipsometer. As an example, the test spectrum data may include data based on a predetermined wavelength band. As an example, the predetermined wavelength band may be determined based on the quality of the test layer formed on the test substrate.

Meanwhile, the controller 160 may generate the regression analysis model using a machine learning technique based on various base algorithms. The base algorithm may be at least one of random forest, AdaBoost, gradient boosting, polynomial regression, or Gaussian process regression. However, this is only an example, the base algorithm is not limited thereto, and the regression analysis model may be generated based on another base algorithm. Characteristics such as the size of a training data set required for generation of the model and accuracy may be different for each algorithm. For example, the size of a training data set required for generation of a model with a desired accuracy may be different for each algorithm.

In the thickness estimation method according to the exemplary embodiment in the present disclosure, the controller 160 may set a loss function and select the base algorithm to generate the regression analysis model (S200). The loss function may mean a difference between an output value of a model generated by the machine learning technique and an output value desired by the user. Basically, the loss function may be a mean square error (MSE). However, this is only an example, and the loss function is not limited thereto. A cross entropy error (CEE) and the like may also be used as needed.

The sizes (N1, N2, and N3) of the training data set required when using the random forest, the AdaBoost, and the gradient boosting for generating the regression analysis model using learners may be similar to one another. The size (N4) of the training data set required when using the polynomial regression may be relatively larger than those when using other algorithms. The size (N5) of the training data set required when using the Gaussian process regression may be relatively smaller than those when using other algorithms. For example, the numbers of training data required for the respective algorithms may be as follows: N4>N1≈N2≈N3>N5.

The number of training data required in the Gaussian process regression may be several hundreds, for example, 200 to 300. On the other hand, the number of training data required in the random forest, the AdaBoost, and the gradient boosting may be approximately 1000, and the number of training data required in the polynomial regression may be approximately 2000. Therefore, the user may select an algorithm to be used to generate the regression analysis model, based on the size of a training data set obtained from the test substrate and processing accuracy required by the semiconductor substrate.

Next, whether or not a separate parameter is required for the base algorithm selected in S200 may be determined (S210). In a case in which a separate parameter is required (S210, Yes), an optimal value suitable for the base algorithm may be selected (S220). As an example, parameters for the number of terminal nodes and the depth of a tree may be required for the random forest, the AdaBoost, and the gradient boosting. Meanwhile, a parameter for the degree of a polynomial with which the model is to be expressed may be required for the polynomial regression, and a hyper parameter may be required for the Gaussian process regression. The optimal parameter suitable for each algorithm may vary depending on a processing target and environment.

Therefore, the optimal parameter suitable for each algorithm may be arbitrarily selected by the user.

Once initial setting for generating the regression analysis model is completed, the controller 160 may generate the regression analysis model that significantly reduces the loss function of the data set (S230). A method of significantly reducing the loss function may be different for each algorithm. However, in the machine learning technique using each algorithm, the loss function may be significantly reduced gradually by repeating learning based on the training data set.

Meanwhile, the controller 160 may verify the regression analysis model generated using the data set (S240), and the regression analysis model may be continuously updated in a process of performing the processing. The user may select a regression analysis model suitable for a processing target through verification of regression analysis models generated using the respective algorithms, and apply the selected regression analysis model to the thickness estimation method according to the exemplary embodiment in the present disclosure.

Figure 9:
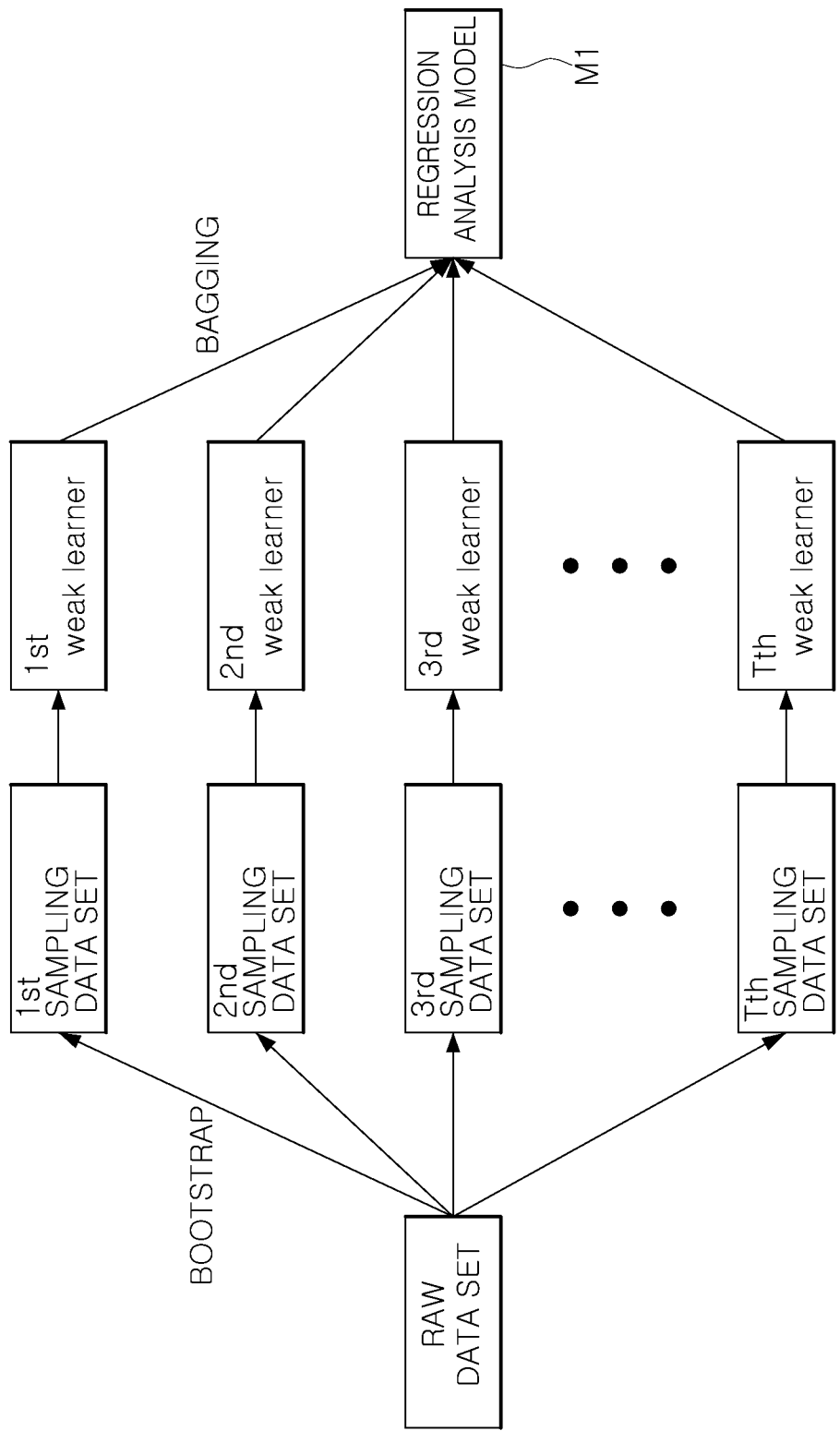
FIGS. 9 through 11 are diagrams for describing an algorithm used to generate the regression analysis model in the thickness estimation method, according to exemplary embodiments in the present disclosure.
Figure 10:
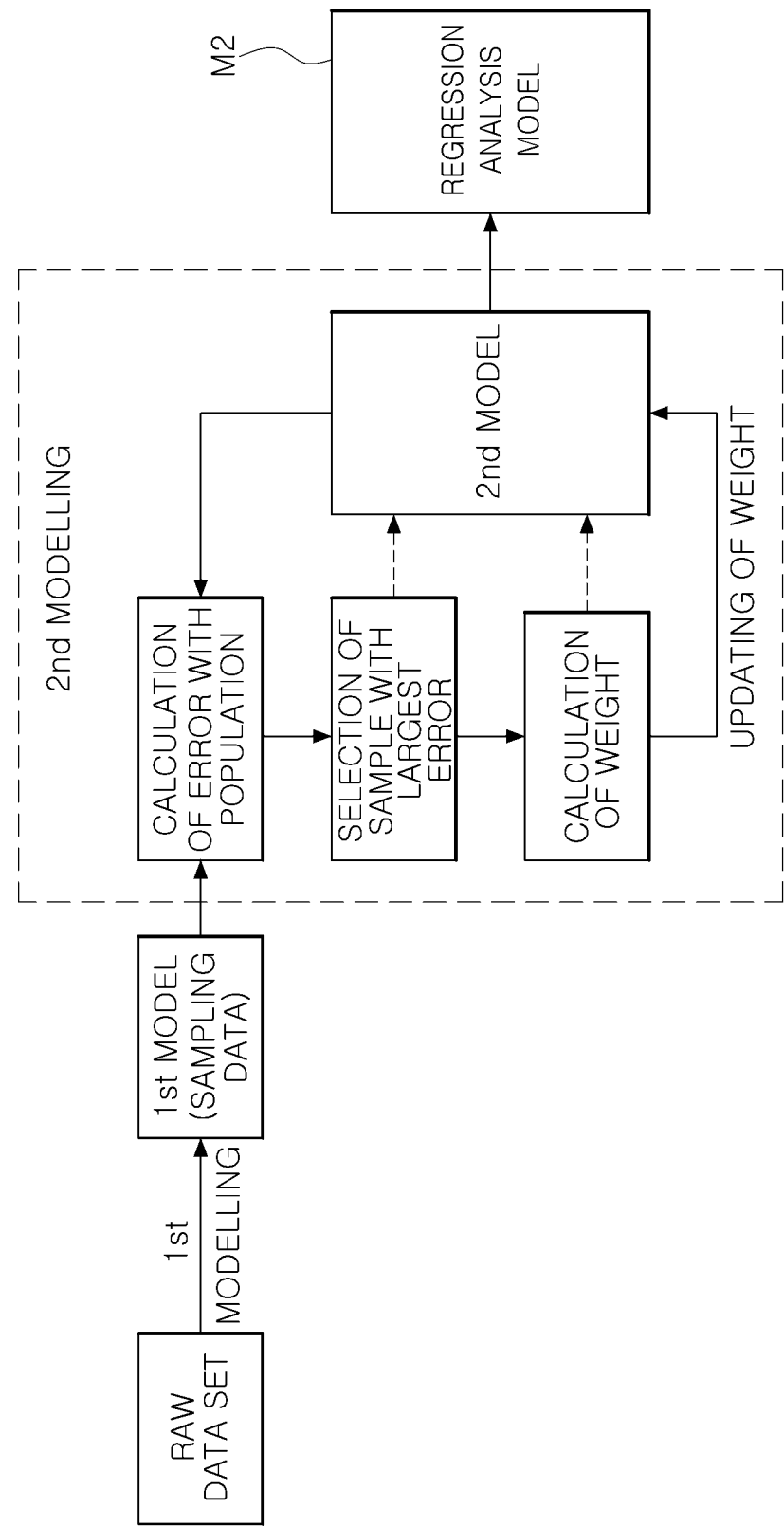
Figure 11:
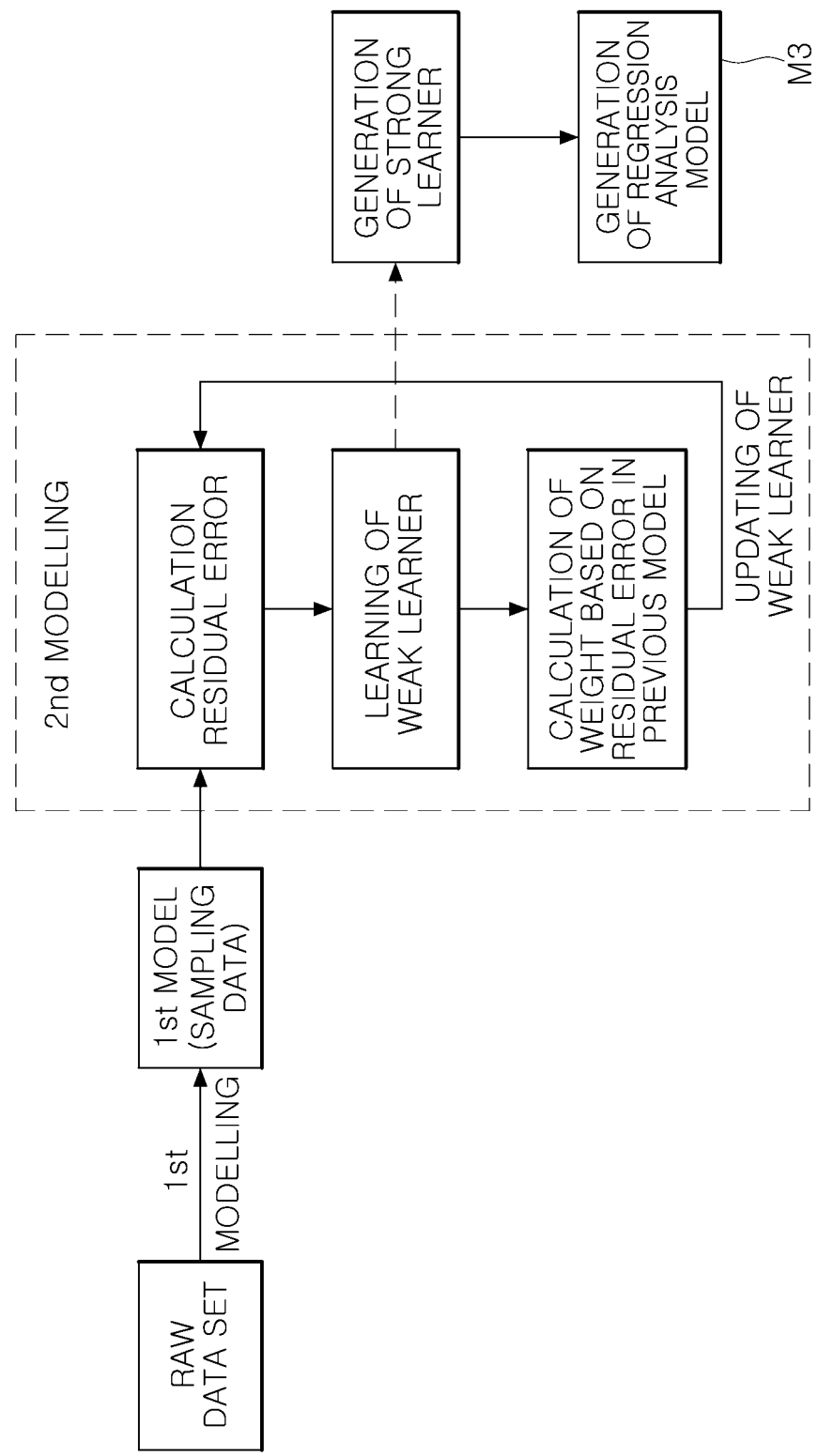

FIGS. 9 through 11 are diagrams for describing an algorithm used to generate the regression analysis model in the thickness estimation method according to exemplary embodiments in the present disclosure.

Referring to FIG. 9, the regression analysis model may be generated using the random forest. The random forest may include a bootstrap process in which a data set having the same size as a raw data set is generated by allowing duplication of given data, and a bagging process in which respective learners (weak learners) trained based on the data generated in the bootstrap process are combined.

In the thickness estimation method according to the exemplary embodiment in the present disclosure, T sampling data sets having the same size as that of a data set obtained from the test spectrum data of the test substrate may be generated using the bootstrap process based on the obtained data set. Further, respective learners constituting the forest may be trained and modeled based on T generated sampling data sets that are different from each other. The learner trained through the bootstrap process reduces variance while maintaining a bias as it is, such that performance of the learner may be improved. Finally, the respective learners trained and modeled may be bagged as one random forest. A regression analysis model M1 may be generated based on the bagged random forest.

Referring to FIGS. 10 and 11, the regression analysis model may be generated using the AdaBoost or gradient boosting, which are boosting techniques, as well. In a case of using the AdaBoost, a high-performance regression analysis model may be generated by supplementing a previously trained model for one model.

Referring to FIG. 10, in a case of generating the regression analysis model using the AdaBoost, a newly trained model may be made more fitted to data that it is difficult to learn, while increasing the weighted value of underfitted sampling data.

In the thickness estimation method according to the exemplary embodiment in the present disclosure, a primary model including sampling data may be generated using a data set obtained from the test spectrum data of the test substrate. An error from an entire population may be calculated in consideration of each sampling data, and the weighted value of sampling data with the smallest error may be calculated to be relatively large. The weighted value may be initially set to be the same for each sampling data. The primary model may be updated to a secondary model by reflecting the calculated weighted value. A regression analysis model M2 may be generated by repeating update based on the sampling data.

Referring to FIG. 11, in a case of generating the regression analysis model using the gradient boosting, a new model may be trained using a residual error in a previously trained model, rather than updating the weighted value of sampling data.

In the thickness estimation method according to the exemplary embodiment in the present disclosure, a primary model including sampling data may be generated using a data set obtained from the test spectrum data of the test substrate. A residual error between each sampling data and a sample may be calculated, and a learner may be trained using the residual error. A regression analysis model M3 may be generated by calculating the weighted value based on the residual error in the previous model, and using a strong learner trained by reflecting the calculated weighted value.

Meanwhile, the regression analysis model may also be generated using the polynomial regression or Gaussian process regression. In a case of using the polynomial regression, the regression analysis model may be assumed to be in a form of an nth degree polynomial for one-dimensional data. Meanwhile, in a case of using the Gaussian process regression, the regression analysis model may be expressed under the assumption that data are in Gaussian distribution. In each algorithm, a set of outputs may be expressed in a form of a matrix for the regression analysis model expressed based on assumption, and then a coefficient vector required for model configuration may be calculated by inverse matrix calculation.

Figure 12:
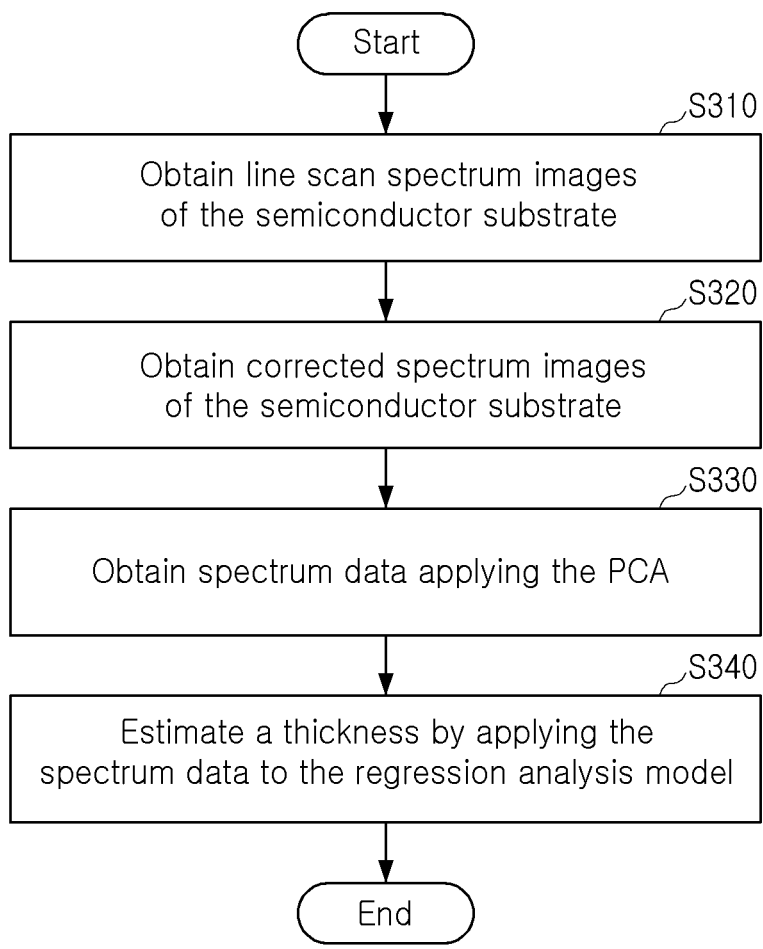
FIG. 12 is a flowchart illustrating a process of estimating the thickness of a target layer formed on a semiconductor substrate based on the generated regression analysis model in the thickness estimation method, according to the exemplary embodiment in the present disclosure.

FIG. 12 is a flowchart illustrating a process of estimating the thickness of the target layer formed on the semiconductor substrate based on the generated regression analysis model in the thickness estimation method according to the exemplary embodiment in the present disclosure.

Referring to FIG. 12, in the thickness estimation method according to the exemplary embodiment in the present disclosure, a spectrum image corresponding to the semiconductor substrate subjected to the processing is captured, and spectrum data obtained from the spectrum image may be applied to the regression analysis model. The thickness of the target layer formed on the semiconductor substrate subjected to the processing may be estimated using the regression analysis model, and a result of the processing may be confirmed.

As an example, in a case in which the degree of polishing of the semiconductor substrate is not properly controlled in a process of performing the polishing processing, a semiconductor device to be manufactured using the semiconductor substrate may have a defect. The examination device that performs the thickness estimation method according to the exemplary embodiment in the present disclosure may estimate the thickness of the target layer formed on the semiconductor substrate while the semiconductor substrate is transferred by the transfer robot, and determine whether or not the polishing processing is normally performed.

Referring to FIG. 12, the thickness estimation method according to the exemplary embodiment in the present disclosure may include obtaining line scan spectrum images of the semiconductor substrate (S310) to estimate the thickness of the target layer formed on the semiconductor substrate using the generated regression analysis model. S310 may be performed by the optical system 30 illustrated in FIG. 2. The obtained line scan spectrum images may be combined to form an original spectrum image.

Meanwhile, the thickness estimation method according to the exemplary embodiment in the present disclosure may include obtaining corrected spectrum image of the semiconductor substrate (S320). Obtaining the corrected spectrum image of the semiconductor substrate may include converting the original spectrum image into a corrected spectrum image of the semiconductor substrate. A circle correction algorithm that converts the original spectrum image into the corrected spectrum image will be described later.

The corrected spectrum image may have the same shape as that of the semiconductor substrate, and coordinates of the corrected spectrum image may correspond to coordinates of the semiconductor substrate. Therefore, spectrum data corresponding to each coordinate of the semiconductor substrate may be obtained from the corrected spectrum image. Spectrum data included in a predetermined wavelength band may be obtained by applying the PCA technique to the obtained spectrum data (S330).

With the thickness estimation method according to the exemplary embodiment in the present disclosure, the thickness of the target layer formed on the semiconductor substrate may be estimated over the entire area by applying the spectrum data obtained in S330 to the regression analysis model that is generated in advance (S340).

Figure 13:
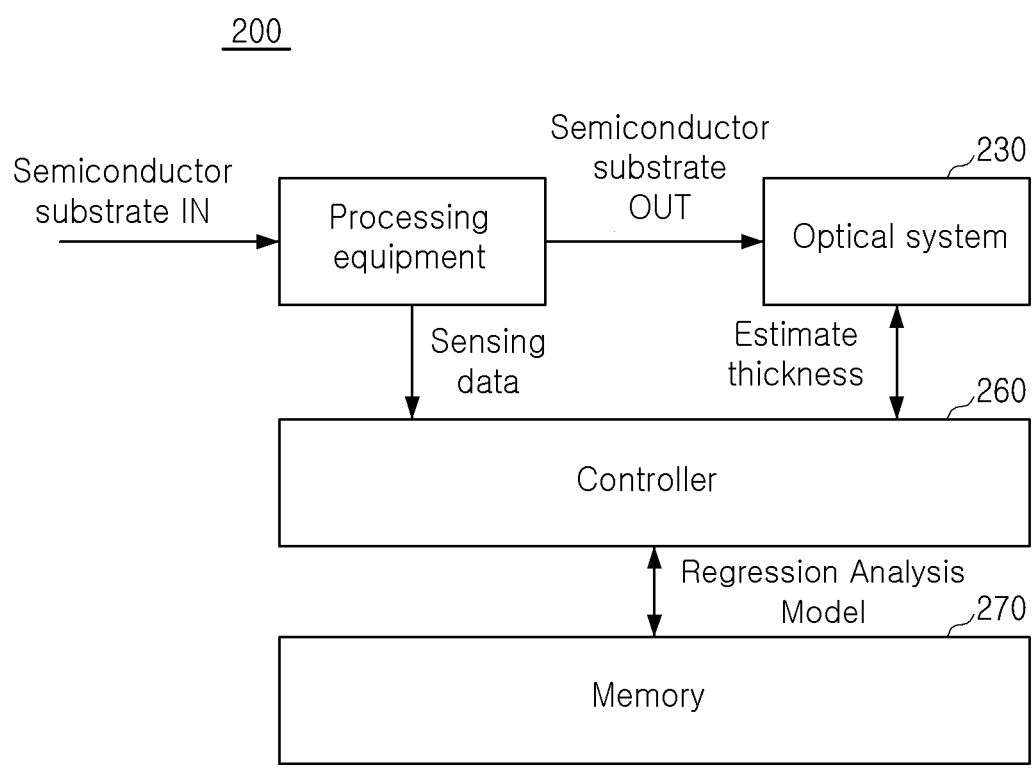
FIG. 13 is a block diagram illustrating components for estimating the thickness of the target layer formed on the semiconductor substrate in the thickness estimation method, according to the exemplary embodiment in the present disclosure.

FIG. 13 is a block diagram illustrating components for estimating the thickness of the target layer formed on the semiconductor substrate in the thickness estimation method according to the exemplary embodiment in the present disclosure.

Referring to FIG. 13, an examination device 200 for performing the thickness estimation method according to the exemplary embodiment in the present disclosure may include an optical system 230, a controller 260, and a memory 270. As an example, the examination device 200 may correspond to the examination device 100 illustrated in FIG. 5. For example, the optical system 230, the controller 260, and the memory 270 of FIG. 13 may be the same as the optical system 130, the controller 160, and the memory 170 of FIG. 5, respectively. However, this is only an example, and the components of the examination device 200 are not limited thereto. At least some of the components described above may be provided as separate devices as long as the thickness estimation method according to the exemplary embodiment in the present disclosure may be performed.

The semiconductor substrate may pass through the processing equipment to estimate the thickness of the target layer formed on the semiconductor substrate using the regression analysis model. Sensing data for the semiconductor substrate that are obtained in the processing process may be transferred to the controller 260. The sensing data may be used for the estimation of the thickness of the target layer. Meanwhile, the optical system 230 may obtain a spectrum image of light reflected from the semiconductor substrate passing through the processing equipment and transfer the spectrum image to the controller 260.

The controller 260 may estimate the thickness of the target layer using the regression analysis model stored in the memory 270, the spectrum image of the semiconductor substrate, and the sensing data for the semiconductor substrate in the processing process. Meanwhile, the semiconductor substrate may be defined as a test substrate in a process of updating the regression analysis model. For example, separately from the process of estimating the thickness of the target layer formed on the semiconductor substrate, the regression analysis model may be updated as in the flowchart illustrated in FIG. 4 using the semiconductor substrate. Meanwhile, the updated regression analysis model may be stored in the memory 270. Thereafter, the updated regression analysis model stored in the memory 270 may be used when estimating the thickness of the target layer formed on the semiconductor substrate in the semiconductor processing.

Figure 14:
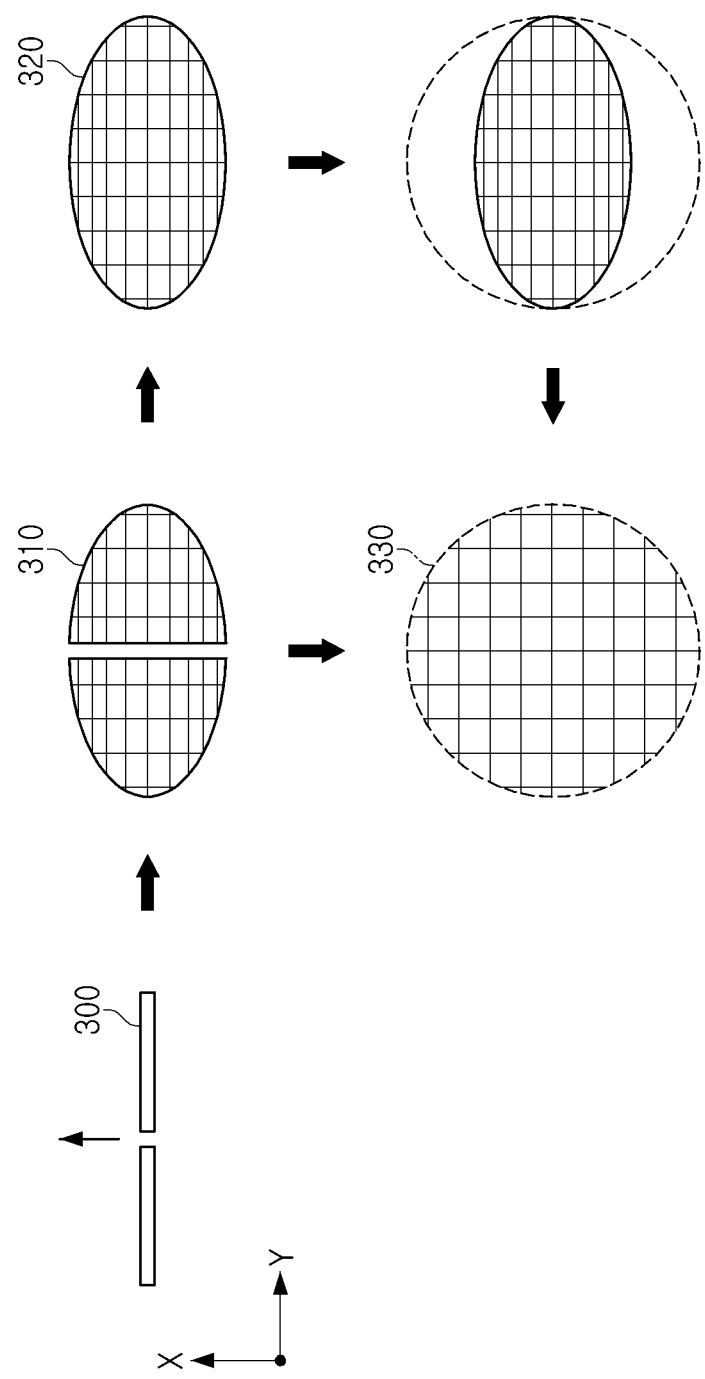
FIG. 14 is a diagram illustrating a spectrum image of the semiconductor substrate that changes according to a circle correction algorithm in the thickness estimation method, according to the exemplary embodiment in the present disclosure.

FIG. 14 is a diagram illustrating a spectrum image of the semiconductor substrate that changes according to the circle correction algorithm in the thickness estimation method according to the exemplary embodiment in the present disclosure.

Referring to FIG. 14, the semiconductor substrate may be examined using a spectrum image captured by the optical system while the semiconductor substrate is transferred by the transfer robot. Meanwhile, a transfer speed of the semiconductor substrate may change over time. Further, since the transfer path of the semiconductor substrate is not long, a time taken for transfer of the semiconductor substrate by the transfer robot may be insufficient for capturing, by the optical system, the image of the semiconductor substrate. Therefore, in an original spectrum image 320 obtained in a section where the transfer speed increases/decreases, the semiconductor substrate may have a distorted shape. Therefore, a correction procedure for correcting the distortion may be performed to more accurately examine the semiconductor substrate.

Line scan spectrum images 300 of the semiconductor substrate that are captured in the thickness estimation method according to the exemplary embodiment in the present disclosure may have a line shape. Further, since the scan camera included in the optical system may include a plurality of coupled cameras, the line scan spectrum images 300 may be spectrum images captured by dividing the semiconductor substrate into a plurality of regions. Meanwhile, the line scan spectrum images 300 are illustrated as two lines in the example illustrated in FIG. 14, but this is only an example, and the line scan spectrum images 300 are not limited to two lines.

The optical system may generate scan spectrum images 310 of the semiconductor substrate by extracting frames in which the semiconductor substrate is present by analyzing the captured line scan spectrum images 300 in a unit of frame, and aggregating wavelength data included in the line scan spectrum images 300. The scan spectrum images 310 may be captured by the plurality of cameras included in the scan camera included in the optical system, respectively. As an example, in a case in which the scan camera included in the optical system includes a plurality of coupled cameras, the number of generated scan spectrum images 310 may correspond to the number of cameras.

The plurality of generated scan spectrum images 310 may be converted into one original spectrum image 320 in consideration of the boundary of the semiconductor substrate. The original spectrum image 320 may have a shape different from an actual shape of the semiconductor substrate due to a non-linear movement of the transfer robot or stage, and vibration during transfer. As an example, the original spectrum image 320 may have an oval shape with noise.

In the example illustrated in FIG. 14, a direction in which the transfer robot transfers the semiconductor substrate may be a first direction (y direction). When image capturing using the optical system is performed, the transfer speed of the semiconductor substrate is not constant in the transfer direction, but may increase or decrease, and the example illustrated in FIG. 14 may correspond to a case in which the transfer speed decreases. Therefore, in the original spectrum image 320, the semiconductor substrate having a circular shape may be shown as having an oval shape with a minor axis in the transfer direction due to distortion into a compressed shape.

Meanwhile, in a case in which the speed of transfer of the semiconductor substrate in the transfer direction increases when image capturing using the optical system is performed, in the original spectrum image 320, the semiconductor substrate may be shown as having a shape different from that in the example illustrated in FIG. 14. As an example, in the original spectrum image 320, the semiconductor substrate may be expressed as having an oval shape with a major axis in the transfer direction. However, the shape of the semiconductor substrate shown in the original spectrum image 320 is not limited to the oval shape, but may vary depending on the transfer speed, vibration generated during transfer, and the like.

In order to improve accuracy of examination performed using the image captured by the optical system, in the thickness estimation method according to the exemplary embodiment in the present disclosure, distortion may be corrected by applying an image correction process to the original spectrum image 320 in a unit of pixel, the original spectrum image 320 being generated based on the line scan spectrum images 300. The optical system according to the exemplary embodiment in the present disclosure may generate a corrected spectrum image 330 by correcting coordinates of respective pixels included in the original spectrum images 320 according to a predetermined algorithm. As an example, the coordinates of the pixels included in the original spectrum image 320 may be corrected to be coordinates corresponding to pixels of the circular shape which is the actual shape of the semiconductor substrate. As a result, the corrected spectrum image 330 may have the circular shape corresponding to the actual shape of the semiconductor substrate. For example, the thickness of the target layer may be estimated at accurate coordinates on the semiconductor substrate using the circle correction algorithm.

The circle correction algorithm described with reference to FIG. 14 corresponds to an example that may be adopted by the optical system in the thickness estimation method according to the exemplary embodiment in the present disclosure. The corrected spectrum image 330 may also be generated from the line scan spectrum images 300 by adopting a method other than the circle correction algorithm, or adopting both the circle correction algorithm and another method.

In the thickness estimation method according to the exemplary embodiment in the present disclosure, the corrected spectrum image 330 may include spectrum data of light reflected from the semiconductor substrate. The spectrum data may be dimensionally reduced to PCA spectrum data included in a predetermined wavelength band using the PCA technique. The PCA spectrum data may be used as data for generating the regression analysis model or estimating the thickness. As an example, the PCA spectrum data used when generating the regression analysis model may be data related to the test substrate, and the PCA spectrum data used when estimating the thickness may be data related to the semiconductor substrate.

Figure 15:
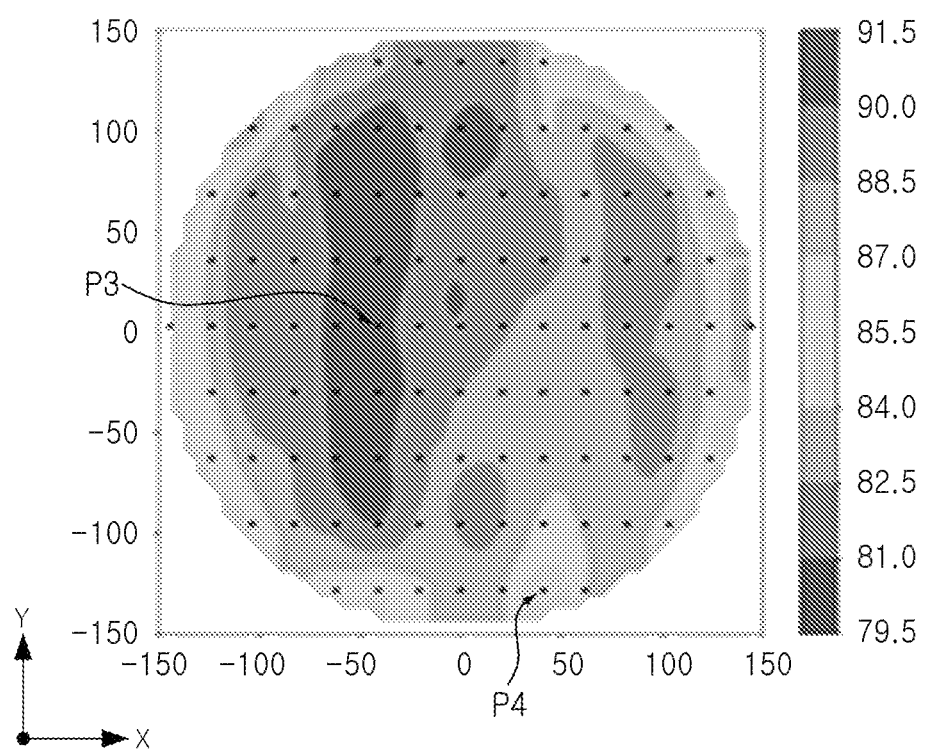
FIG. 15 is a diagram for describing a result of estimating the thickness of the target layer formed on the semiconductor substrate in the thickness estimation method, according to the exemplary embodiment in the present disclosure.

FIG. 15 is a diagram for describing a result of estimating the thickness of the target layer formed on the semiconductor substrate in the thickness estimation method according to the exemplary embodiment in the present disclosure.

Referring to FIG. 15, the examination device that performs the thickness estimation method according to the exemplary embodiment in the present disclosure may estimate the thickness of the target layer over the entire area of the semiconductor substrate. Meanwhile, the estimated thickness of the target layer on the semiconductor substrate may be non-uniform over the entire area. Further, estimated thickness distribution of the target layer on the semiconductor substrate may be different from the measured thickness distribution of the test layer on the test substrate illustrated in FIG. 7. As an example, the thickness of the target layer at a third coordinate P3 of the semiconductor substrate, which corresponds to the first coordinate P1 of the test substrate, may be in a range of approximately 90 nm to 91.5 nm. Meanwhile, the thickness of the target layer at a fourth coordinate P4 of the semiconductor substrate, which corresponds to the second coordinate P2 of the test substrate, may be in a range of approximately 84 nm to 85.5 nm.

Meanwhile, the image of the semiconductor substrate may be captured and RGB values of pixels may be used to estimate the thickness of the target layer formed on the semiconductor substrate. In a case of applying the thickness estimation method according to the exemplary embodiment of the present disclosure, accuracy may be improved by approximately 15% to 25%, as compared with a case in which the thickness of the target layer is estimated using thickness data of the test layer that are obtained from the test substrate and RGB data of image pixels. However, this is only an example, and the degree of improvement in accuracy is not limited thereto. The degree of improvement in accuracy when in comparison to a case in which the thickness of the target layer is estimated using the estimated thickness distribution of the target layer, the estimated thickness of the target layer, and the RGB values may vary depending on exemplary embodiments.

Figure 16:
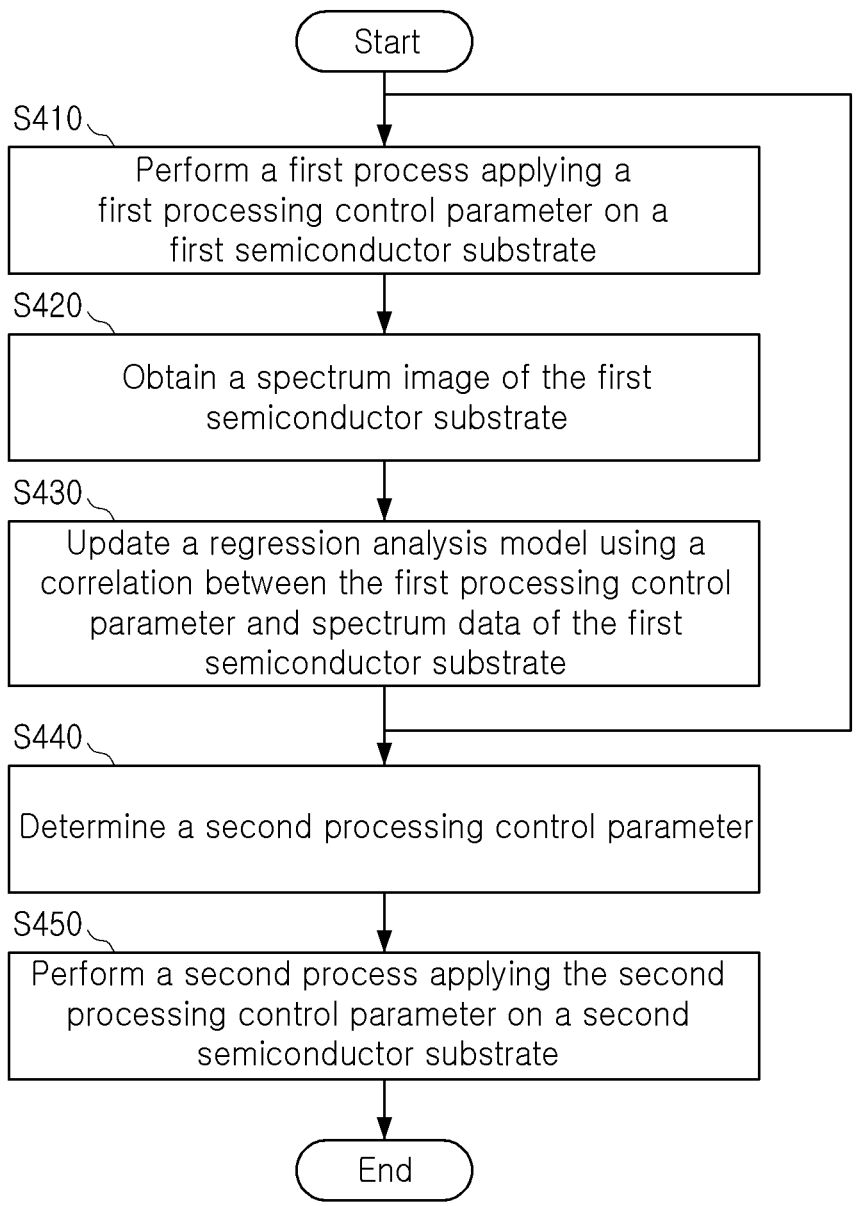
FIG. 16 is a flowchart illustrating a process of controlling processing using a processing control parameter in a processing control method, according to an exemplary embodiment in the present disclosure.

FIG. 16 is a flowchart illustrating a process of controlling processing using a processing control parameter in the processing control method according to the exemplary embodiment in the present disclosure.

Referring to FIG. 16, in the processing control method according to the exemplary embodiment in the present disclosure, the regression analysis model may be updated using the first processing control parameter applied to the processing of the first semiconductor substrate, such that an optimal processing control parameter for the processing of the second semiconductor substrate to be performed later may be determined. As an example, the optimal processing control parameter may be determined based on the processing control parameter for the semiconductor substrate, the spectrum data obtained from the spectrum image, and the thickness data of the target layer formed on the semiconductor substrate.

The processing control method according to the exemplary embodiment in the present disclosure may include performing a first semiconductor processing on the first semiconductor substrate to which the first processing control parameter is applied (S410). As an example, the processing control parameter is a parameter related to an environment when performing the processing, and the thickness of the layer on the semiconductor substrate after the processing may be determined by the processing control parameter. As an example, the semiconductor processing may include CMP processing, spin-coating processing, and the like.

Meanwhile, after the semiconductor processing is completed, a spectrum image and spectrum data of the first semiconductor substrate may be obtained by the same steps as S310 to S330 illustrated in FIG. 12 (S420). The regression analysis model generated in advance and stored in the memory may be updated based on a correlation between the spectrum data corresponding to the first semiconductor substrate and the first processing control parameter (S430). As an example, the regression analysis model stored in the memory may be the regression analysis model generated by the process illustrated in FIG. 4.

In the processing control method according to the exemplary embodiment in the present disclosure, S410 to S430 may be repeated for a plurality of semiconductor substrates. As an example, S410 to S430 may be repeated, such that accuracy in determining the optimal processing control parameter using the regression analysis model may be improved. As an example, the second processing control parameter may be the optimal processing control parameter, and the second processing control parameter may be determined using the previously updated regression analysis model (S440).

After performing the semiconductor processing on the first semiconductor substrate, the second semiconductor processing to which the second processing control parameter is applied may be performed on the second semiconductor substrate, the same as the first semiconductor substrate (S450).

In a case in which the semiconductor processing is not normally performed due to an inappropriate processing control, a semiconductor device to be manufactured using the semiconductor substrate may have a defect. The examination device that performs the processing control method according to the exemplary embodiment in the present disclosure may update the regression analysis model using the processing control parameter for the processing, and may efficiently control the subsequent processing to be normally performed.

Figure 17:
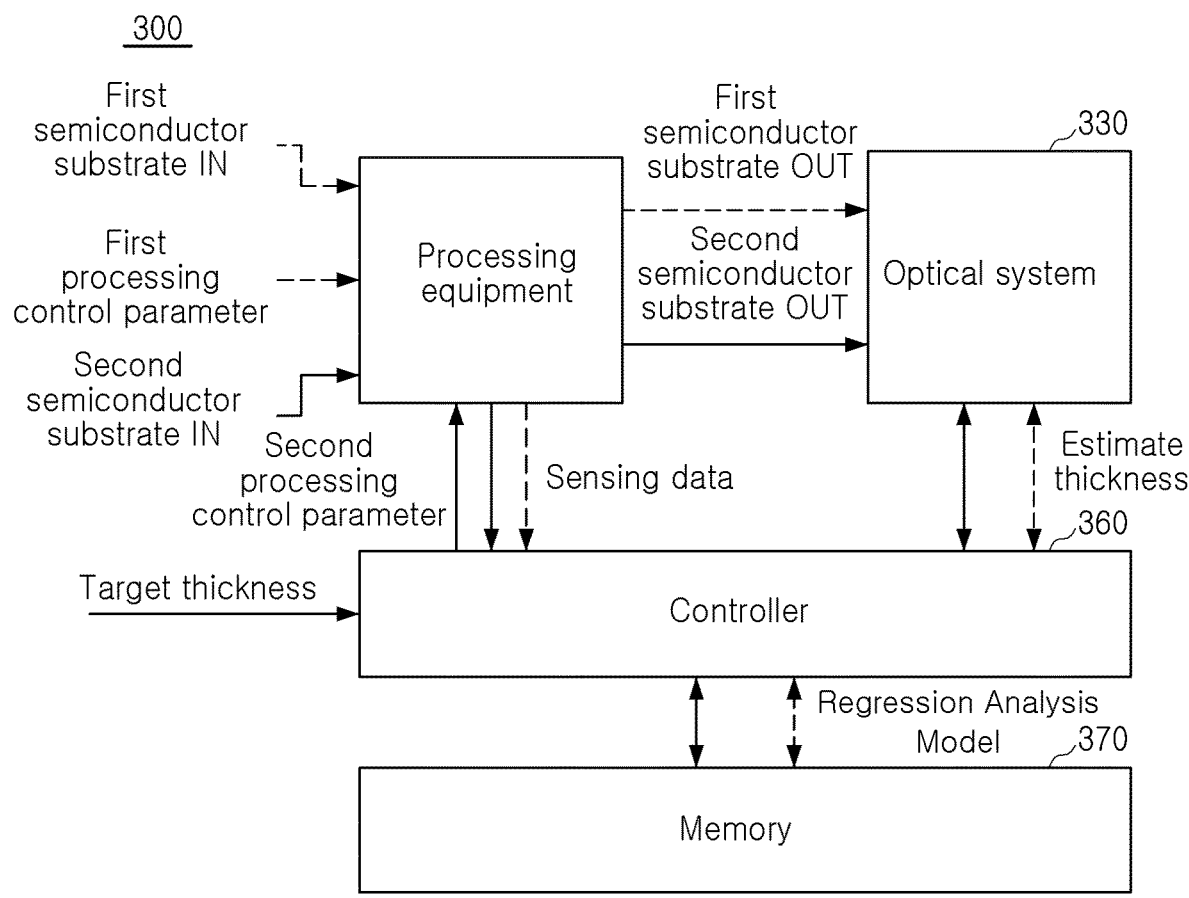
FIG. 17 is a block diagram illustrating components for controlling processing using a processing control parameter in the processing control method, according to the exemplary embodiment in the present disclosure.

FIG. 17 is a block diagram illustrating components for controlling processing using the processing control parameter in the processing control method according to the exemplary embodiment in the present disclosure.

Referring to FIG. 17, an examination device 300 for performing the processing control method according to the exemplary embodiment in the present disclosure may include an optical system 330, a controller 360, and a memory 370. As an example, the examination device 300 may correspond to the examination device 100 illustrated in FIG. 5. For example, the optical system 330, the controller 360, and the memory 370 of FIG. 17 may be the same as the optical system 130, the controller 160, and the memory 170 of FIG. 5, respectively. However, this is only an example, and the components of the examination device 300 are not limited thereto. At least some of the components described above may be provided as separate devices as long as the thickness estimation method according to the exemplary embodiment in the present disclosure may be performed.

The first semiconductor substrate may pass through the processing equipment to estimate the thickness of a target layer formed on the first semiconductor substrate using the regression analysis model, and control the processing by setting a target thickness of the layer. The processing for the first semiconductor substrate may be controlled based on a predetermined first processing control parameter. Sensing data for the first semiconductor substrate that are obtained in the processing process and information on the first processing control parameter may be transferred to the controller 360. The sensing data may be used for both the estimation of the thickness of the target layer and the determination of the processing control parameter. Meanwhile, the optical system 330 may obtain a spectrum image of light reflected from the first semiconductor substrate passing through the processing equipment and transfer the spectrum image to the controller 360.

The controller 360 may estimate the thickness of the target layer using the regression analysis model stored in the memory 370, the spectrum image of the first semiconductor substrate, and the sensing data for the first semiconductor substrate in the processing process. Meanwhile, the controller 360 may update the regression analysis model using the estimated thickness of the target layer, the first processing control parameter in the processing process for the first semiconductor substrate, and the sensing data. The updated regression analysis model may be stored in the memory 370.

The second semiconductor substrate may pass through the processing equipment to perform the processing control method according to the exemplary embodiment in the present disclosure. As an example, the second semiconductor substrate may be a substrate different from the first semiconductor substrate, and the processing for the second semiconductor substrate may be performed after the regression analysis model is updated based on the processing for the first semiconductor substrate. In the block diagram illustrated in FIG. 17, contents related to the processing for the first semiconductor substrate are indicated by dotted lines, and contents related to the processing for the second semiconductor substrate are indicated by solid lines.

Before performing the processing for the second semiconductor substrate, a target thickness of the layer formed on the second semiconductor substrate may be input to the controller 360. The input target thickness may be generated in advance and applied to the thickness estimation model stored in the memory 370. Therefore, the controller 360 may determine the second processing control parameter to perform processing for achieving the target thickness of the layer. For example, the optimal processing control parameter may be set according to a desired thickness of the layer.

The processing for the second semiconductor substrate may be controlled based on the determined second processing control parameter. As an example, in the CMP processing, the first processing control parameter and the second processing control parameter may include the pressure of the carrier head and a processing time. However, the first processing control parameter and the second processing control parameter are not limited thereto, and may further include the rotation speed of the carrier head, the rotation speed of the polishing table, and the like. As an example, in the spin-coating processing, the first processing control parameter and the second processing control parameter may include a baking time, a baking temperature, and the like.

Meanwhile, data obtained from the processing for the second semiconductor substrate may be used for updating the regression analysis model again. In this case, the second semiconductor substrate may be re-defined similar to the first semiconductor substrate illustrated in FIG. 17. The update may be continuously repeated through the processing for a plurality of semiconductor substrates, and an automatic update system may be built. As a result, deterioration in productivity that is caused when the user estimates the processing control parameter by manually referring to processing control information may be prevented, and a cost-effective and efficient processing control may be performed.

The thickness estimation method according to the exemplary embodiment in the present disclosure may be performed in combination not only with the processing control method, but also with a defect inspection method. As an example, the generated regression analysis model may estimate a result of defect inspection of the semiconductor substrate using a correlation between thickness data of the target layer formed on the semiconductor substrate, and a parameter required for analysis of the defect inspection. As an example, the regression analysis model may be continuously updated by repeating the defect inspection. However, this is only an example, and automatic classification based on various characteristics of the semiconductor substrate and parameters may also be performed using a spectrum image of light reflected from the upper surface of the semiconductor substrate.

The thickness estimation method and the processing control method according to the exemplary embodiments described above may be used for manufacturing various semiconductor devices. As an example, the semiconductor device may be applied to a logic element such as a central processing device (central processing unit (CPU) or microprocessor unit (MPU)) or an application processor (AP). The semiconductor device may also be applied to a volatile memory device such as a dynamic random access memory (DRAM) or a static random access memory (SRAM), a flash memory device, or a non-volatile memory device such as a phase-change random access memory (PRAM), a magnetoresistive random access memory (MRAM), or a resistive random access memory (RRAM).

As set forth above, according to the exemplary embodiment in the present disclosure, in the thickness estimation method and the processing control method, the spectrum image of the semiconductor substrate may be captured on the transfer path, and the thickness of the target layer formed on the semiconductor substrate may be estimated over the entire area using the regression analysis model generated using various algorithms. Meanwhile, by installing an examination device for performing the thickness estimation method according to the exemplary embodiment in the present disclosure on the transfer path of the semiconductor substrate, whether or not the processing is normally performed may be rapidly determined without requiring a separate time for the examination after modifying processing equipment and performing the processing. In addition, estimation of the processing control parameter is performed in conjunction with a processing control, such that productivity may be improved and costs may be reduced.

While exemplary embodiments have been shown and described above, it will be apparent to those skilled in the art that modifications and variations could be made without departing from the scope of the present invention as defined by the appended claims.

What is claimed is:
1. A thickness estimation method comprising:
obtaining a test spectrum image from reflected light obtained by irradiating a test substrate with light;
obtaining test spectrum data included in a predetermined wavelength band at a plurality of positions on the test substrate, from the test spectrum image;
measuring a thickness of a test layer formed on the test substrate at the plurality of positions;
generating a regression analysis model using a correlation between the thickness of the test layer and the test spectrum data at the plurality of positions, and storing the regression analysis model in a memory;
irradiating a semiconductor substrate that is being transferred with light;
obtaining a spectrum image corresponding to an entire area of the semiconductor substrate; and
estimating a thickness of a target layer corresponding to the test layer over the entire area of the semiconductor substrate by applying the spectrum image to the regression analysis model.

2. The thickness estimation method of claim 1,
wherein the spectrum image is obtained by an optical system, and
wherein the optical system includes:
a lens on which light reflected from the semiconductor substrate is incident;
a spectrometer module splitting the incident light; and
a scan camera capturing an image of the split light in a form of a spectrum.

3. The thickness estimation method of claim 2,
wherein the scan camera includes a first camera capturing an image of a first region of the semiconductor substrate and a second camera capturing an image of a second region of the semiconductor substrate, and
wherein the images of the first region and the second region are combined to form the spectrum image.

4. The thickness estimation method of claim 1, wherein the obtaining the spectrum image includes:
obtaining line scan spectrum images using an optical system;
generating an original spectrum image of the semiconductor substrate using wavelength data included in the line scan spectrum images; and
generating a corrected spectrum image by applying a circle correction algorithm to the original spectrum image.

5. The thickness estimation method of claim 1, wherein the thickness of the test layer at the plurality of positions on the test substrate is measured using optical critical dimension (OCD) measurement.

6. The thickness estimation method of claim 1, further comprising:
performing normalization of the test spectrum data after obtaining the test spectrum image.

7. The thickness estimation method of claim 1, wherein the predetermined wavelength band is determined based on quality of at least one of the test layer and the target layer.

8. The thickness estimation method of claim 1, wherein the regression analysis model is automatically optimized through periodic update of the test spectrum data.

9. The thickness estimation method of claim 1,
wherein the semiconductor substrate is irradiated with the light by an illumination unit disposed on a transfer path of the semiconductor substrate, and
wherein the spectrum image is obtained using an optical system that is integrated with the illumination unit.

10. The thickness estimation method of claim 1, wherein the obtaining the spectrum image is performed by an optical system while the semiconductor substrate is transferred from a first device to a second device by a transfer robot.

11. The thickness estimation method of claim 10, further comprising:
performing a semiconductor processing before the semiconductor substrate is transferred from the first device to the second device,
wherein the estimating the thickness of the target layer over the entire area of the semiconductor substrate is performed separately from the semiconductor processing.

12. The thickness estimation method of claim 10, wherein when the transfer robot transfers the semiconductor substrate, a transfer speed of the semiconductor substrate changes over time.

13. A processing control method comprising:
obtaining a test spectrum image from reflected light obtained by irradiating a test substrate with light;
generating a regression analysis model using a correlation between test spectrum data included in the test spectrum image and thickness data of a test layer formed on the test substrate, and storing the regression analysis model in a memory;

performing a semiconductor processing on a first semiconductor substrate to which a first processing control parameter is applied;

obtaining a spectrum image of the first semiconductor substrate on a transfer path of the first semiconductor substrate subjected to the semiconductor processing;

obtaining spectrum data included in a predetermined wavelength band from the spectrum image;

updating the regression analysis model using a correlation between the spectrum data and the first processing control parameter;

determining a second processing control parameter using the regression analysis model; and performing the semiconductor processing on a second semiconductor substrate, which is the same as the first semiconductor substrate, and to which the second processing control parameter is applied.

14. The processing control method of claim 13,
wherein the semiconductor processing is chemical-mechanical polishing (CMP) processing, and
wherein the first processing control parameter and the second processing control parameter include a processing pressure and a processing time.

15. The processing control method of claim 13,
wherein the semiconductor processing is spin-coating processing, and
wherein the first processing control parameter and the second processing control parameter include a baking time and a baking temperature.

16. The processing control method of claim 13, wherein the second processing control parameter is determined by setting a target thickness of a target layer formed on the second semiconductor substrate by the semiconductor processing, and applying the target thickness to the regression analysis model.

17. The processing control method of claim 13, wherein the second processing control parameter is automatically optimized, and is determined by the regression analysis model that is updated using the correlation between the spectrum data and the first processing control parameter.

18. A thickness estimation method comprising:
obtaining a test spectrum image corresponding to a plurality of positions on a test substrate;

generating a regression analysis model using a correlation between test spectrum data included in the test spectrum image and thickness data of a test layer formed on the test substrate, and storing the regression analysis model in a memory;

irradiating a semiconductor substrate that is being transferred with light and obtaining a spectrum image corresponding to an entire area of the semiconductor substrate; and estimating a thickness of a target layer over the entire area of the semiconductor substrate by applying spectrum data based on the spectrum image of the semiconductor substrate to the regression analysis model.

19. The thickness estimation method of claim 18,
wherein the regression analysis model is continuously updated using a correlation between thickness data of the target layer and a processing control parameter with which processing for the semiconductor substrate is performed, and
wherein the processing is performed by adjusting the processing control parameter for the semiconductor substrate.

20. The thickness estimation method of claim 18,
wherein the regression analysis model is continuously updated using a correlation between thickness data of the target layer and a parameter required for analysis of defect inspection for the semiconductor substrate, and
wherein a result of the defect inspection is predicted from thickness data of a layer formed on a substrate on which the defect inspection is to be performed.

* * * * *